(12) United States Patent
Prasad et al.

(10) Patent No.: US 12,198,565 B2
(45) Date of Patent: Jan. 14, 2025

(54) SYSTEMS AND METHODS FOR PREDICTING AND PREVENTING COLLISIONS

(71) Applicant: GE Precision Healthcare LLC, Wauwatosa, WI (US)

(72) Inventors: Raghu Prasad, Bangalore (IN); Chinnakotla Krishna Teja Reddy, Bangalore (IN); Rahul Gupta, Bangalore (IN); Sanket Mali, Bangalore (IN); Ayushi Vishwakarma, Bangalore (IN)

(73) Assignee: GE Precision Healthcare LLC, Wauwatosa, WI (US)

(*) Notice: Subject to any disclaimer, the term of this patent is extended or adjusted under 35 U.S.C. 154(b) by 470 days.

(21) Appl. No.: 17/372,917

(22) Filed: Jul. 12, 2021

(65) Prior Publication Data
US 2023/0011319 A1 Jan. 12, 2023

(51) Int. Cl.
*G08B 21/02* (2006.01)
*G06V 40/20* (2022.01)
(Continued)

(52) U.S. Cl.
CPC .............. *G08G 9/02* (2013.01); *G06V 40/20* (2022.01); *G08B 21/02* (2013.01); *G08B 21/182* (2013.01)

(58) Field of Classification Search
CPC ........ G08G 9/02; G06V 40/20; G06V 40/103; G06V 40/174; G06V 2201/121;
(Continued)

(56) References Cited

U.S. PATENT DOCUMENTS 9,538,158 B1 1/2017 Rush et al.
10,147,184 B2 12/2018 Kusens et al.
(Continued)

FOREIGN PATENT DOCUMENTS

EP 3103385 A1 12/2016
JP 2005128967 A 5/2005
(Continued)

OTHER PUBLICATIONS

Solbach et al, Vision-Based Fallen Person Detection for the Elderly, 2017, arXiv:1707.07608v2, pp. 1-10. (Year: 2017).*
(Continued)

*Primary Examiner* — Aaron W Carter
*Assistant Examiner* — Kathleen M Broughton
(74) *Attorney, Agent, or Firm* — Andrus Intellectual Property Law, LLP

(57) ABSTRACT

A method for preventing a collision between a first object and a second object using a camera. The method includes capturing images of the first object and the second object using the camera, accessing a database of point clouds, and identify a first point cloud corresponding to the first object and a second point cloud corresponding to the second object within the database of point clouds, where the first point cloud corresponds to the first object being a person. The method further includes calculating a distance between the first object and the second object and comparing the distance to a threshold. The method further includes generating a notification when the distance is below the threshold.

20 Claims, 36 Drawing Sheets

(51) Int. Cl.
  *G08B 21/18* (2006.01)
  *G08G 9/02* (2006.01)
(58) Field of Classification Search
  CPC .... G06V 10/143; G06V 10/82; G06V 10/761;
        G06V 20/52; G08B 21/02; G08B 21/182;
        G08B 21/043; G08B 21/0476; A61B
        5/1115; A61B 5/1117
  See application file for complete search history.

(56) References Cited

U.S. PATENT DOCUMENTS

| | | | |
|---|---|---|---|
| 10,456,102 B2 | 10/2019 | Don et al. | |
| 10,475,206 B1* | 11/2019 | Rush | G06T 7/254 |
| 10,489,661 B1 | 11/2019 | Rush et al. | |
| 10,600,204 B1 | 3/2020 | Rush et al. | |
| 2010/0298661 A1* | 11/2010 | McCombie | G08B 21/0446 |
| | | | 600/587 |
| 2013/0267791 A1* | 10/2013 | Halperin | A61B 5/6891 |
| | | | 600/300 |
| 2015/0112151 A1 | 4/2015 | Muhsin et al. | |
| 2015/0206000 A1 | 7/2015 | Kaliouby et al. | |
| 2015/0281659 A1 | 10/2015 | Hood et al. | |
| 2016/0256080 A1* | 9/2016 | Shen | A61B 5/6891 |
| 2017/0007196 A1* | 1/2017 | Don | A61B 6/461 |
| 2018/0092574 A1 | 4/2018 | Tzvieli et al. | |
| 2019/0214146 A1 | 7/2019 | Dunias et al. | |
| 2019/0340441 A1* | 11/2019 | Franz | A61B 5/1077 |
| 2020/0331481 A1 | 10/2020 | Szczerba | |
| 2021/0271865 A1 | 9/2021 | Osawa et al. | |
| 2023/0008323 A1* | 1/2023 | Reddy | A61B 5/1122 |

FOREIGN PATENT DOCUMENTS

| | | |
|---|---|---|
| WO | 2020206155 | 10/2020 |
| WO | 2021050966 | 3/2021 |

OTHER PUBLICATIONS

Volkhardt et al, Fallen Person Detection for Mobile Robots using 3D Depth Data, 2013, IEEE International Conference on Systems, Man and Cybernetics, pp. 1-6. (Year: 2013).*

Li et al, USIP: Unsupervised Stable Interest Point Detection from 3D Point Clouds, 2019, arXiv:1904.00229v1, pp. 1-19. (Year: 2019).*

P. Bauer, J. B. Kramer, B. Rush and L. Sabalka, "Modeling bed exit likelihood in a camera-based automated video monitoring application," 2017 IEEE International Conference on Electro Information Technology (EIT), Lincoln, NE, 2017, pp. 056-061, doi: 10.1109/EIT.2017.8053330.

Kittipanya-Ngam P, Guat OS, Lung EH. Bed detection for monitoring system in hospital wards. Conf Proc IEEE Eng Med Biol Soc. 2012;2012:5887-5890. doi:10.1109/EMBC.2012.6347333.

Liu, Shuangjun, Yu Yin, and Sarah Ostadabbas. "In-Bed Pose Estimation: Deep Learning With Shallow Dataset." IEEE Journal of Translational Engineering in Health and Medicine 7 (2019): 1-12. Crossref. Web.

* cited by examiner

Prone

Left-lateral

Right-lateral

Class-0

Class-1

Class-3

Class-4

Class-5

Class-6

Class-7

Class-8

SYSTEMS AND METHODS FOR PREDICTING AND PREVENTING COLLISIONS

FIELD

The present disclosure generally relates to predicting and preventing collisions, and particularly between a patient and another person or object.

BACKGROUND

Within Patient collisions are a serious and common patient safety problem in hospitals and other care facilities. The cost of extra care for the patients who collide and sustain severe injuries is nearly $14,000 greater than for patients who do not. Almost 80-90% of collisions in hospitals are generally unobserved. Therefore, developing an accurate and robust real time method to prevent these patient collisions is a challenge. Providing an adequate lead time for attenders of a patient to prevent the collision is also a major challenge.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One example of the present disclosure generally relates to a method for monitoring a patient in a bed using a camera. The method includes identifying a boundary of the bed using data from the camera, identifying parts of the patient using data from the camera, and determining an orientation of the patient using the parts identified for the patient. The method further includes monitoring movement of the patient using the parts identified for the patient and computing a departure score indicating the likelihood of the patient departing the bed based on the orientation of the patient and the movement of the patient. The method further includes comparing the departure score to a predetermined threshold and generating a notification when the departure score exceeds the predetermined threshold.

In certain examples, the method further includes identifying positions for rails of the bed, distinctly from the boundary of the bed, using data from the camera, where the departure score is based in part on the positions identified for the rails.

In certain examples, the method further includes determining when the patient turns based on the movement monitored and counting a number of the turns, where the departure score is based in part on the number of the turns counted.

In certain examples, the movement of the patient is determined by measuring distances between the parts identified for the patient and monitoring changes in the distances measured.

In certain examples, the method further includes determining an illumination level of the data from the camera and comparing the illumination level to a threshold, where the boundary of the bed and the parts of the patient are identified using color images within the data from the camera when the illumination level is at least equal to the threshold.

In certain examples, the camera is a 3D depth camera, where the boundary of the bed and the parts of the patient are identified using IR and depth frames within the data from the camera when the illumination level is below the threshold.

In certain examples, the method further includes identifying positions for rails of the bed using the color images, where the departure score is based in part on the positions identified for the rails.

In certain examples, the departure score is a fall score of the likelihood of the patient falling from the bed, wherein the method further includes identifying facial parts of the patient using the data from the camera, analyzing the facial parts, and computing an agitation score based on the facial parts analysis, where the departure score is further based in part on the agitation score.

In certain examples, the facial parts include eyebrows, where the analysis includes determining a shape of the eyebrows.

In certain examples, the method further includes identifying a face mask, where the analysis of the facial parts includes only the facial parts unobstructed by the face mask.

In certain examples, the bed includes moveable rails and the method further includes moving the rails when the departure score exceeds the predetermined threshold.

In certain examples, determining the orientation of the patient includes determining whether the patient is sitting up, where the departure score is based in part on whether the patient is determined to be sitting up.

In certain examples, the method further includes determining whether the parts are inside the boundary of the bed, where the departure score is based in part on whether the parts are determined to be inside the boundary of the bed.

In certain examples, the boundary identified for the bed and the parts identified for the patient are inputted into a neural network for determining the orientation of the patient.

In certain examples, the method further includes identifying the boundary of the bed includes comparing at least one of color images, IR frame, and depth frames as the data from the camera to model boundaries within an artificial intelligence model.

Another example according to the present disclosure relates to a non-transitory medium having instructions thereon that, when executed by a processing system, causes a patient monitoring system for monitoring a patient in a bed to: operate a camera to image the patient and the bed and to output data from the camera; identify a boundary of the bed using the data from the camera; identify parts of the patient using the data from the camera; determine an orientation of the patient using the parts identified for the patient; monitor movement of the patient using the parts identified for the patient; compute a departure score based on the orientation of the patient and the movement of the patient; compare the departure score to a predetermined threshold; and generate a notification when the departure score exceeds the predetermined threshold.

In certain examples, the non-transitory medium further causes the patient monitoring system to identify positions for rails of the bed, distinctly from the boundary of the bed, using data from the camera, where the departure score is based in part on the positions identified for the rails.

In certain examples, the non-transitory medium further causes the patient monitoring system to: determine an illumination level of the data from the camera and to compare the illumination level to a threshold, where the boundary of the bed and the parts of the patient are identified using color images within the data from the camera when the illumination level is at least equal to the threshold, and where the boundary of the bed and the parts of the patient are identified using at least one of IR and depth frames within the data from the camera when the illumination level is below the threshold.

In certain examples, the non-transitory medium further causes the patient monitoring system to cause moveable rails of the bed to move when the departure score exceeds the predetermined threshold.

Another example according to the present disclosure relates to a method for preventing patient falls from a bed having moveable rails using a 3D depth camera generating data as color images, IR frames, and depth frames. The method includes determining an illumination level of the data from the camera and comparing the illumination level to a threshold and identifying a boundary of the bed using the color images when the illumination level is at least equal to the threshold and using at least one of the IR frames and the depth frames when the illumination level is below the threshold. The method further includes identifying parts of the patient using the color images when the illumination level is at least equal to the threshold and using at least one of the IR frames and the depth frames when the illumination level is below the threshold. The method further includes identifying positions of the rails using the color images from the camera and measuring distances between the parts identified for the patient and counting a number of turns by the patient based on changes in the distances measured between the parts. The method further includes determining an orientation of the patient using the parts identified for the patient and computing a fall score based on the orientation of the patient, the positions identified for the rails, and the number of turns by the patient. The method further includes comparing the fall score to a predetermined threshold and moving the rails when the fall score exceeds the predetermined threshold.

The present disclosure further relates to preventing a collision between a first object and a second object using a camera. The method includes capturing images of the first object and the second object using the camera and accessing a database of point clouds. The method further includes identifying a first point cloud corresponding to the first object and a second point cloud corresponding to the second object within the database of point clouds, where the first point cloud corresponds to the first object being a person. The method further include calculating a distance between the first object and the second object, comparing the distance to a threshold, and generating a notification when the distance is below the threshold.

In certain examples, wherein the first point cloud for the first object is based on a first mask identified as corresponding to the first object and the second point cloud for the second object is based on a second mask identified as corresponding to the second object, where the distance between the first object and the second object is calculated between the first point cloud and the second point cloud. In certain examples, nearest points between the first point cloud and the second point cloud are used to calculate the distance between the first point cloud and the second point cloud.

In certain examples, the first object is a patient and the method further includes identifying that the patient is within a bed, where the second object is other than the bed.

In certain examples, the first object is identified as being the patient based on identifying that the patient was within the bed and the method further includes maintaining the identification of the first object being the patient after the patient has left the bed.

In certain examples, a third object is captured in the images from the camera and the method further includes identifying a third point cloud within the database of point clouds that corresponds to the third object and identifying the third object as being a caregiver. In certain examples, the third object is identified as being the caregiver based on the patient being identified as being within a bed. In further examples, the method further includes excluding notifications based on the third object when the third object is identified as being the caregiver.

In certain examples, the method further includes determining a collision probability based on comparing the distance to the threshold. In certain examples, the first object is a patient in a bed and the method further includes determining an orientation of the patient, where the collision probability varies based on the orientation of the patient. In certain examples, the orientation is classified as being one of supine, prone, and lateral. In certain examples, counting a number of times the orientation changes for the patient, wherein the collision probability varies based on the number of times the orientation changes for the patient.

In certain examples, the first object is identified as being a patient, where the patient has body parts, and where the distance between the first object and the second object is calculated each of the body parts, where the method further includes determining when the distance for each of the body parts to the second object is less than the threshold. In certain examples, the notification includes an image of the patient and the body parts thereof, and the method further includes displaying a given body part within the body parts differently within the image when the distance corresponding thereto is less than the threshold. In certain examples, the method further includes showing the given body part in a given color only when the distance corresponding thereto is less than the threshold.

In certain examples, the first object and the second object are inside a patient room, where the camera is within the patient room, and where the notification is an audible alarm within the patient room.

In certain examples, calculating the distance between the first object and the second object and comparing the distance to the threshold are performed in real-time.

The present disclosure also relates to a non-transitory medium having instructions thereon that, when executed by a processing system, causes a system for preventing collisions between a first object and a second object using a camera to: capture images of the first object and the second object using the camera; access a database of point clouds; identify a first point cloud corresponding to the first object and a second point cloud corresponding to the second object within the database of point clouds, wherein the first point cloud corresponds to the first object being a person; calculate a distance between the first object and the second object; compare the distance to a threshold; and generate a notification when the distance is below the threshold.

In certain examples, the first object is identified as being a patient, where the patient has body parts, and where the distance between the first object and the second object is calculated each of the body parts, where the system is further caused to determine when the distance for each of the body parts to the second object is less than the threshold, where the notification includes an image of the patient and the body parts thereof, and where the system is further caused to display a given body part within the body parts differently within the image when the distance corresponding thereto is less than the threshold.

The present disclosure further relates to a method for preventing a collision between a patient and a second object using a 3D camera by capturing images of the patient and the second object using the 3D camera and accessing a database of masks. The method further includes identify a first mask corresponding to the patient and a second mask corresponding to the second object within the database of masks and generating a first point cloud for the patient based on the first mask and a second point cloud for the second object based on the second mask. The method further includes calculating a distance between nearest points within the first point cloud and the second point cloud, determining an orientation of the patient, and determining a collision probability based on distance calculated between the nearest points within the first point cloud and the second point cloud and based on the orientation determined for the patient. A notification is generated when the collision probability exceeds a threshold.

The present disclosure further proposes a system to determine the departure score of patient using an AI based method without using any identified anatomical parts by solely classifying the pose of the patient.

Various other features, objects and advantages of the disclosure will be made apparent from the following description taken together with the drawings.

BRIEF DESCRIPTION OF THE DRAWINGS

The present disclosure is described with reference to the following drawings.

DETAILED DISCLOSURE

The present disclosure generally relates to systems and methods for predicting and preventing patient departures from bed. As is discussed further below, this prediction and prevention may be achieved by detecting the location of a patient and the bed, the location of the patient in the bed, the orientation of the patient within the bed, the restlessness, agitation, and/or emotion of the patient, and the like. As used throughout the present disclosure, departures include accidental falls as well as purposeful exits from the bed, when the patient is in conscious, sub conscious, trauma and no-trauma states. In certain examples, the systems and methods include using deep learning and/or artificial intelligence (AI), as discussed further below. This information can be used by caregivers to monitor the risk of a patient departing the bed, identify that a departure is likely, identify that a departure has occurred, and/or take action to prevent such a departure (e.g., through alarms and/or automatically-deployed safety measures).

The present inventors have also recognized that the risk of patient departures further increases with the presence of various cognitive impairments. These cognitive impairments may be the result of a disease state, pre-operative medications, or post-operative care, for example. In addition to impairing cognition, the patient may also be less stable during these times, and/or have an increased state of agitation as a result of the impaired cognition, each of which may further increase the risks of falling. It should be recognized that this cognitive impairment may also increase the risk of intentionally exiting the bed when the patient should not be, for example.

Figure 1:
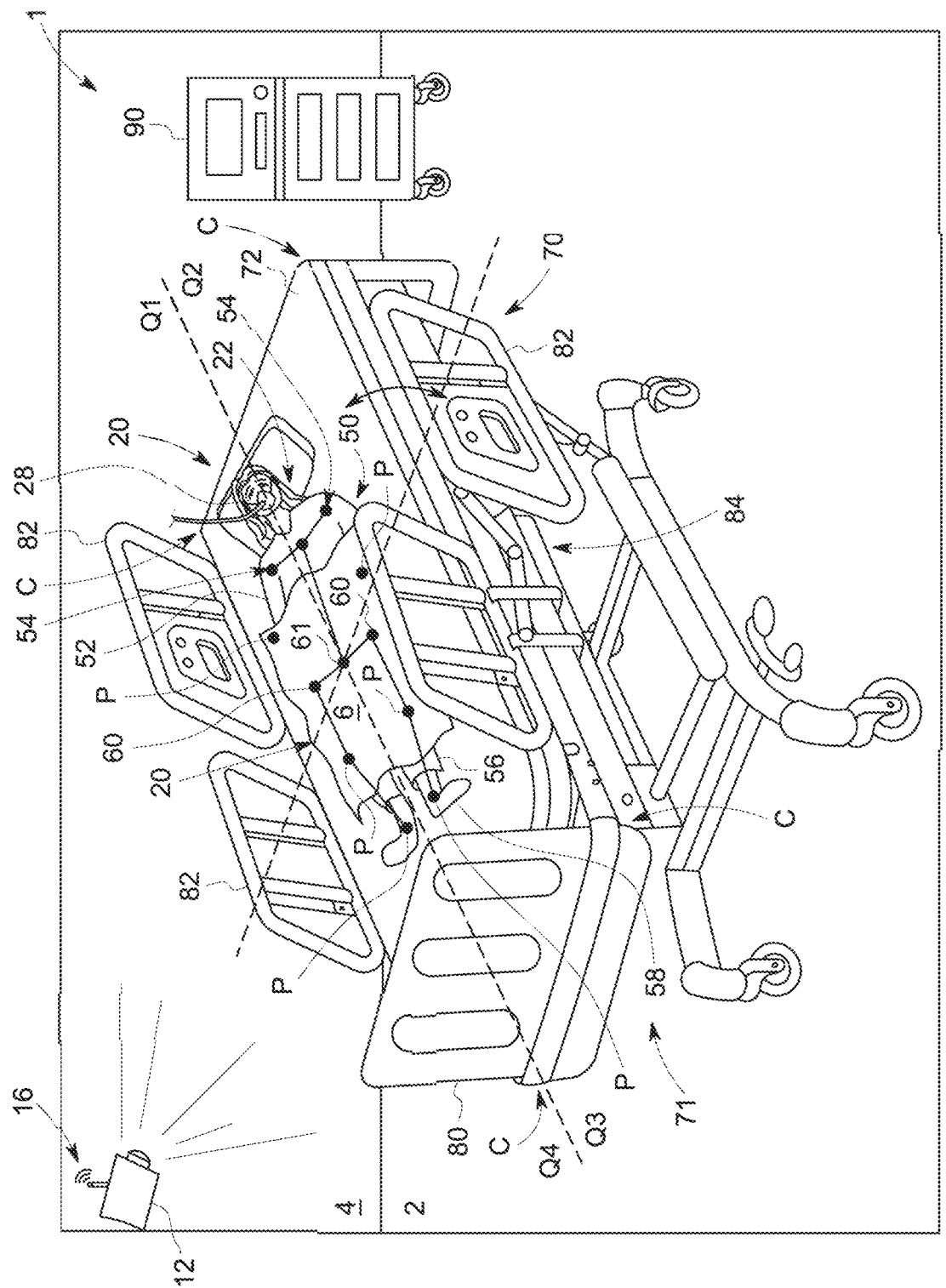
FIG. 1 is a perspective view of a patient lying in bed and being monitored by a system according to the present disclosure.

FIG. 1 depicts an exemplary use case for a system 10 according to the present disclosure. FIG. 1 depicts a room 1 having a floor 2 and wall 4 with a camera 12 positioned to capture images (still and/or video) of the room 1 and items therein. By way of example, the camera 12 may capture 8-bit images (e.g., 100×100 pixel frames), 32-bit images (e.g., 1920×1080 pixel frames), or other sizes and/or aspect ratios. The camera 12 communicates via a communication system 16 (for example, a wireless protocol such as Wi-Fi) for communicating to a monitoring system or central location, which may a caregiver monitoring station 18 (FIG. 15) as conventionally known in the art (for example, GE Healthcare's Mural Virtual Care Solution). A patient 20 is shown resting on a bed 70. In the example shown, only proportions of the patient 20 are visible (i.e., are not covered by the blanket 6), including a head 22, body 50, arms 52, shoulders 54, legs 56, and feet 58. The present inventors have identified that systems presently known in the art are not capable of functioning with the use of blankets or baggy clothing (e.g., hospital gowns) as it obscures the underlying anatomy of the patient. In particular, systems known in the art rely on identifying a particular feature such as the patient's knee, shoulder, or hip to monitor the patient's position in bed. If these points are obscured by a blanket or bulky clothing, these prior art systems are rendered useless and the patient is at risk of a fall. While the presently disclosed systems may identify and use the locations of these body parts as well, these parts need not be visible, as described further below.

The bed 70 has a mattress 72 (which may be segmented, e.g. a head portion shown as 72 and a leg portion 74) supported by a frame 71 that rests on the floor 2. Four corners C define the bed 70. The bed 70 includes four rails 82, one of which being shown in a lowered position to allow the patient to exit, with the remaining three shown in the raised position. The rails 82 are adjustable, and specifically moveable between these raised and lowered positions via rail hardware 84 in a conventional manner. In certain examples, the rails 82 are mechanically moved via motors. The bed 70 of FIG. 1 further includes a footboard 80, with the bed 70 of FIG. 3 also having a headboard 78. Other objects 90 may also be within the field of view of the camera 12 as shown in FIG. 1, such as exemplary medical equipment shown here.

Figure 2:
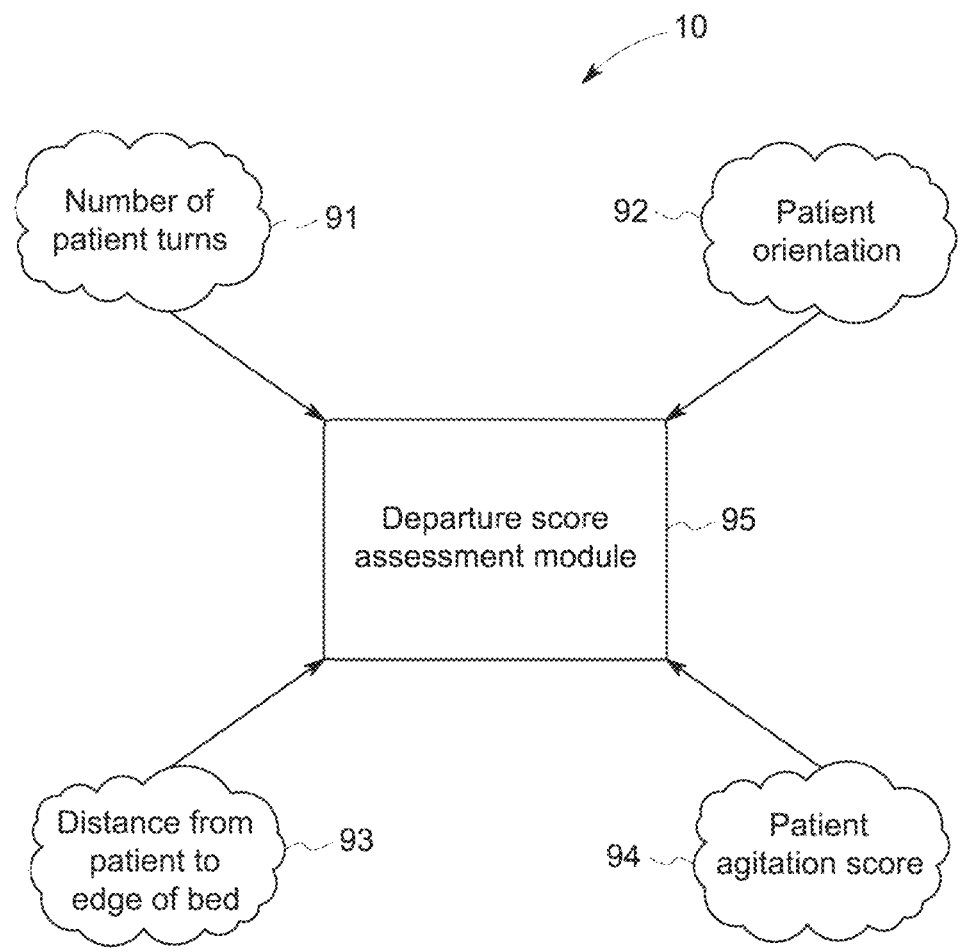
FIG. 2 is a chart depicting exemplary inputs into a departure score assessment module according to the present disclosure.

FIG. 2 depicts exemplary inputs to a departure score assessment module 95 for generating a departure score (according to the present disclosure. As will be discussed further below, the departure score indicates a likelihood of the patient departing the bed, which may be as an accidental fall (thus also referred to as a fall score), or an intentional exit (also referred to as an exit score). For simplicity, the departure score will be described primarily within the context of an unintentional fall (i.e., a fall score). However, the same or similar techniques also apply to determining an exit score, as discussed further below. Likewise, the techniques discussed largely below for determining an exit score (see also FIGS. 25-40) may be used for detecting a fall score.

In the example shown, a first input 91 relates to a number of patient turns, a second input 92 relates to a patient orientation, a third input 93 relates to a distance from the patient to the edge of the bed, and a fourth input 94 relates to a patient agitation score, each of which are determined according to the present disclosure as discussed below. It should be recognized that these inputs are merely examples, which may be excluded or supplemented with other inputs in determining a departure score according to the present disclosure.

Figure 3:
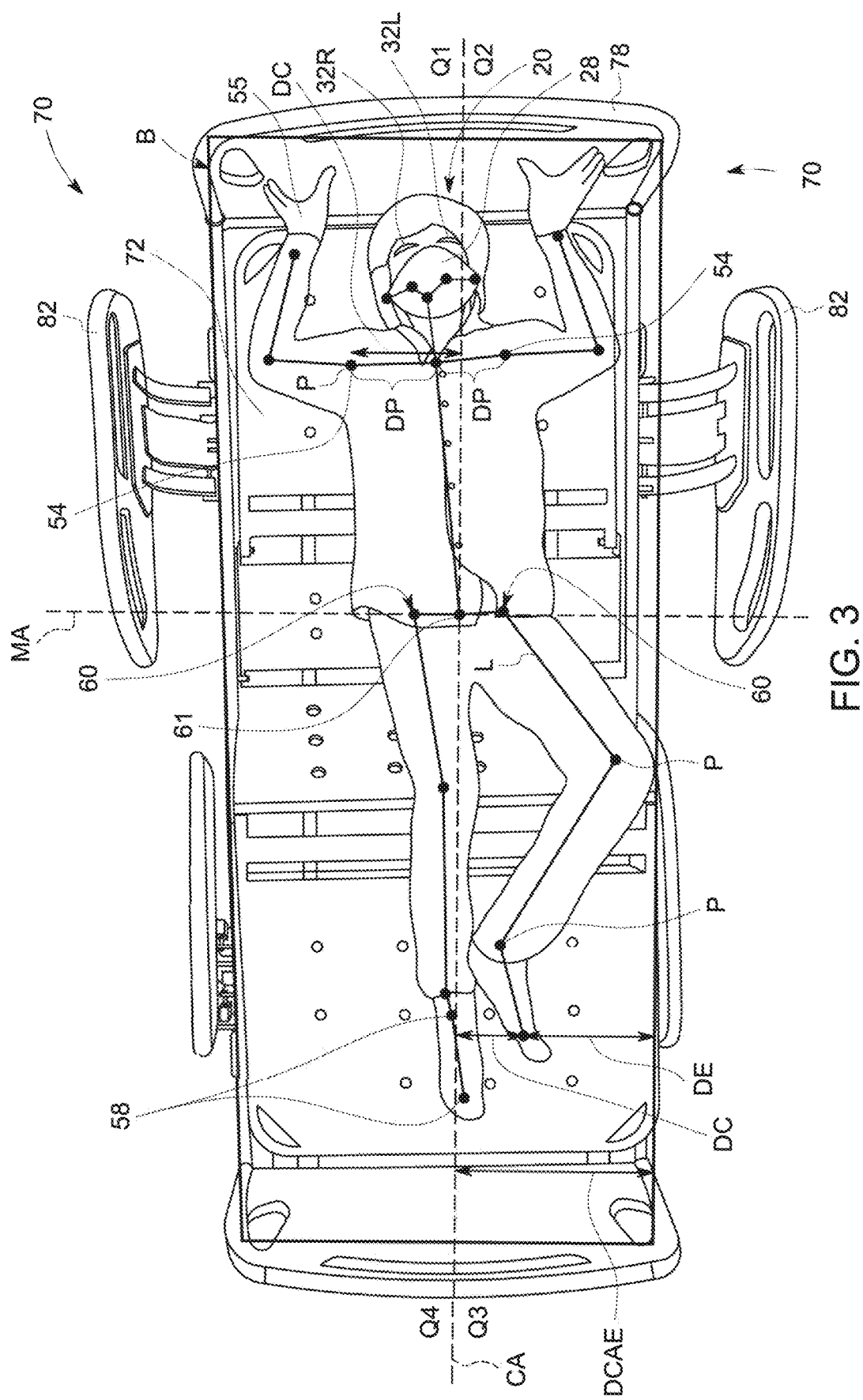
FIG. 3 is an overhead view of an image and analysis in determining a number of patient turns, patient orientation, a distance from the patient to the edge of the bed, and/or a patient agitation score as shown in FIG. 2.

The inputs to the departure score assessment module 95 are now described in further detail. As will become apparent, some of the same steps and preliminary analysis is common to multiple inputs to the departure score assessment module 95. With reference to FIG. 3, four quadrants Q1-Q4 are defined in the image of the patient 20 in the bed 70 collected by the camera 12. In particular, the system 10 identifies the hips 60 of the patient 20 using a technique discussed further below, including via comparison of the image to models using deep learning and/or artificial intelligence. For example, the hips 60 are identified using our key anatomical hotspots detection algorithm. A center point 61 is then identified between the hips 60, for example as the midpoint therebetween. A center axis CA for defining the quadrants is provided extending through the center point 61 between the hips 60 of the patient 20, and likewise a middle axis MA through the center point 61 that is perpendicular to the center axis CA.

Figure 6:
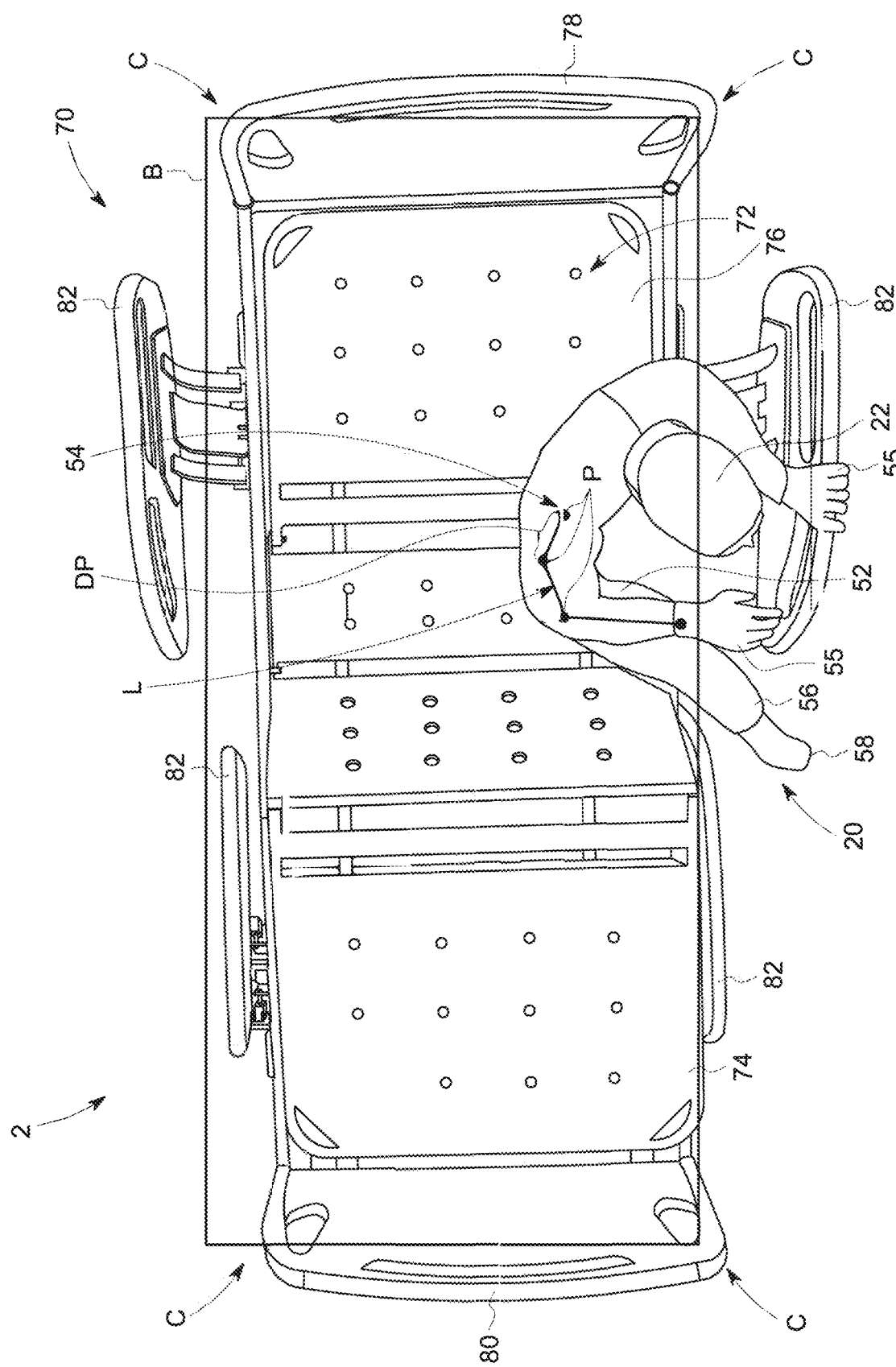
FIG. 6 is an overhead view of images and analysis conducted in executing the process of FIG. 5.

Exemplary anatomical hotspots P identified for the patient 20 are shown on the images of FIGS. 3 and 6, including the shoulders 54, hands 55, and a foot 58. Once these hotspots P are identified for the patient 20, measurements can then be taken between a given hotspots P and other hotspots P, as well as between a given hotspot P and other landmarks. For example, distances between hotspots DP can be calculated between any pair of hotspots P, as well as a distance to edge DE between a given hotspot P and a boundary B of a bed 70, whereby identification of the boundary B is described further below. Likewise, a distance to the center DC may be calculated between a given hotspot P and the center axis CA, as well as a distance from center axis to edge DCAE calculated between the center axis and the boundary B of the bed 70. Lengths of anatomical structures may also be determined via the hotspots P, shown as reference L for the femur in FIG. 3 and the humerus in FIG. 6.

The measured or calculated distances can then be used to monitor the movement of the patient and orientation of the patient over time to identify any changes, such as the patient 20 rolling over or sitting up, for example. In the example of FIG. 3, the patient's right shoulder 54 is identified to be in the first quadrant Q1 and the left shoulder 54 in the second quadrant Q2. Using this information, as well as a distance between hotspots DP of the shoulders 54, it can be determined that the patient is presently lying supine. However, changes to the quadrant identified for either shoulder 54, and/or in the distance between anatomical hotspots DP therebetween can be used to determine that the patient has shifted (or turned) to be lying on the left or right side, for example. Similarly, if one or both of the shoulders 54 is later recognized as being in the third quadrant Q3 or quadrant Q4, the patient 20 may be determined to be sitting upright. In the example of the right shoulder 54 being identified within the third quadrant Q3, the patient 20 may be sitting upright and turned, and/or departing the bed 70 depending on the locations of other key hotspots P and distances to hotspots as described above The inventors further developed a system to identify whether the patient is in sitting or in sleeping position, even when the upper half of bed is inclined using our point cloud based method. In certain examples, the sitting or lying (sleeping) position is determined by calculating the difference between an angle of the upper body and an angle of the lower body. In particular, the bed 70 may be taken as a ground plane to be used as a reference. The point cloud for the patient only (i.e., excluding the bed and any equipment nearby) is isolated using camera depth frames and filtering techniques known in the art to generate a spare filtered point cloud. Noise is also removed from the point cloud in the spare filtered point cloud using techniques known in the art. The spare filtered point cloud is then separated into portions for the upper body and the lower body, which are then used for fitting to an upper body plane and a lower body plane relative to the ground plane. A difference between the upper body plane and the lower body plane can then be determined as n angle therebetween. If the difference is at least 45 degrees, the patient will be determined to be sitting, whereas less than 45 degrees will be deemed to correspond to a sleeping or lying position.

Figure 4:
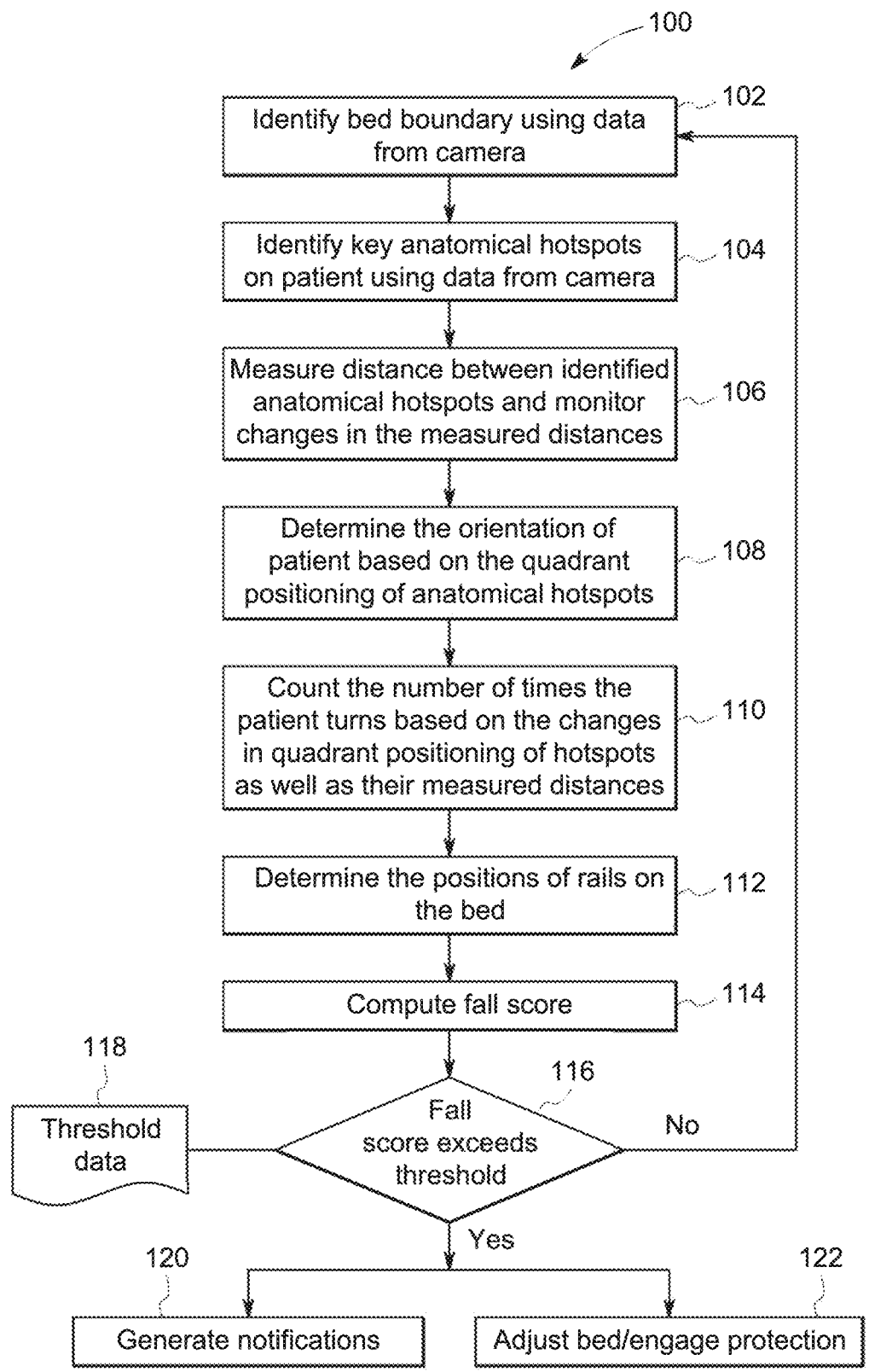
FIG. 4 is one example of a process flow for generating a departure score and resultant outputs according to the present disclosure.

FIG. 4 further details an exemplary process 100 for determining a number of patient turns according to the present disclosure using the identification and comparison of hotspots P discussed above. Additional details for performing each of these steps follow below. As discussed above, the number of patient turns determined may be provided as a first input 91 to the departure score assessment module 95 of FIG. 2. Step 102 provides for identifying a bed boundary of the bed 70 using data collected from the camera 12. Different sub processes are provided for performing step 102 based on a configuration of the room 1, lighting in the room 1, and such or other factors that affect the discernibility of the data collected from the camera 12, which are discussed further below. Step 104 provides for identifying key anatomical hotspots P on the patient using the data from the camera 12, which as discussed may be identified and correlated to individual body parts of the patient 20 through comparison to models, artificial intelligence, and/or deep learning. For example, TensorFlow, Keras, Python, OpenCV, Deep Learning, and/or Computer Vision may be used.

In certain examples, the neural network is trained using point cloud data extracted from depth frames, processed depth frame data and a numpy array consisting of a combination of depth, color, and Infrared frames. Additionally, anatomical hotspots as discussed above are in certain examples generated by the following:

Identify the patient contour using image-based segmentation with depth priors.

Subtract all non-patient regions from the image with the depth distance and shape-based geodesic segmentation. The resulting output will now have only patient related pixels/contours.

Feed the patient specific contour to a 16-layer deep neural recurrent network, which will output a clustered hierarchical progressive mesh model of the patient. This progressive mech will consist of class activation region of various segments of human body Another 8-layer deep neural network identifies various rotating segments in the progressive patient mesh using anatomy shape and texture, whereby rotating segments include those associated with an anatomical joint, for example knees, hips, and shoulders.

These rotating segments-based anatomy shape and texture is then mapped to geometric medial axis of the patient contour, thereby creating anatomical hotspots of the rotating segments.

Once the anatomical hot spots of the rotating segments are identified, a chain rule-based approximation is coupled with region based focal loss to resolve class imbalance of various other non-rotating anatomical segments present along the patient medial axis line. Examples of non-rotating anatomical segments include eyes, noses, ears, chests, and abdomens. These non-rotating anatomical segments are identified by another deep neural network based on focal loss and region-based feature pyramid maps.

The mid-point of rotating anatomical hot spots is identified using a median of boundary of the rotating anatomical hotspots identified above.

The mid-point of non-rotating hot spots is determined by computing the median of the boundary that is generated by focal loss and region based feature pyramid maps hybrid neural network.

With continued reference to FIG. 4, step 106 provides for measuring distances between hotspots P (and other hotspots P, the boundary B of the bed 70, and/or to the center axis CA, for example), whereby these measured distances are then monitored for changes over time. Step 108 then provides for determining the orientation of the patient based on these measured distances. For example, step 108 may determine that a patient is in a supine position on their back if a distance between hotspots DP for the hotspots P associated with the shoulders 54 are at a maximum expected distance apart (in the field of view for the camera 12) and the face is visible, or lying on their side when one shoulder 54 is partially visible or not visible, in which case the distance between hotspots DP between the shoulders 54 would be reduced relative to the supine position. In a similar manner, the system 10 may be used to determine when the patient has rolled on their stomach in a prone position, which may be distinguished from a supine position through identification and concealing of features of the face, for example the left eye 32L or right eye 32R not being visible. Along with distance changes measured above, the present inventors also developed an AI based method to determine the orientation of patient. In certain examples, the inventors trained deep learning models on more on than 10,000 images with multiple orientations and have developed a system to determine the orientation of the patient.

Step 110 provides for counting the number of times that the patient 20 turns by determining when certain anatomical hotspots P (such as the shoulders 54 or hips 60, for example) change quadrants, as well as monitoring the distances between hotspots P between these as discussed above. In other words, each time a patient 20 is determined to change between lying on their left side, right side, supine, or prone, the number of times the patient has turned is incremented by 1. Also, each time the key anatomical hotspots of a patient 20 make a change between quadrants, the patient turn count is incremented by 1.

Step 112 provides for determining the positions of the rails 82, specifically whether they are in a raised or lowered position. As to be discussed further below, this may be determined using the color, IR, and/or depth data collected from the camera 12. Based on the number of times the patient has turned as determined in step 110 relative to a duration of time (in certain examples, tracking every 50 frames or approximately 2 seconds) and the positions of the rails 82 in step 112, a fall score is computed in step 114, as discussed further below. In certain examples, an agitation score is also determined and incorporated into the fall score.

Figure 15:
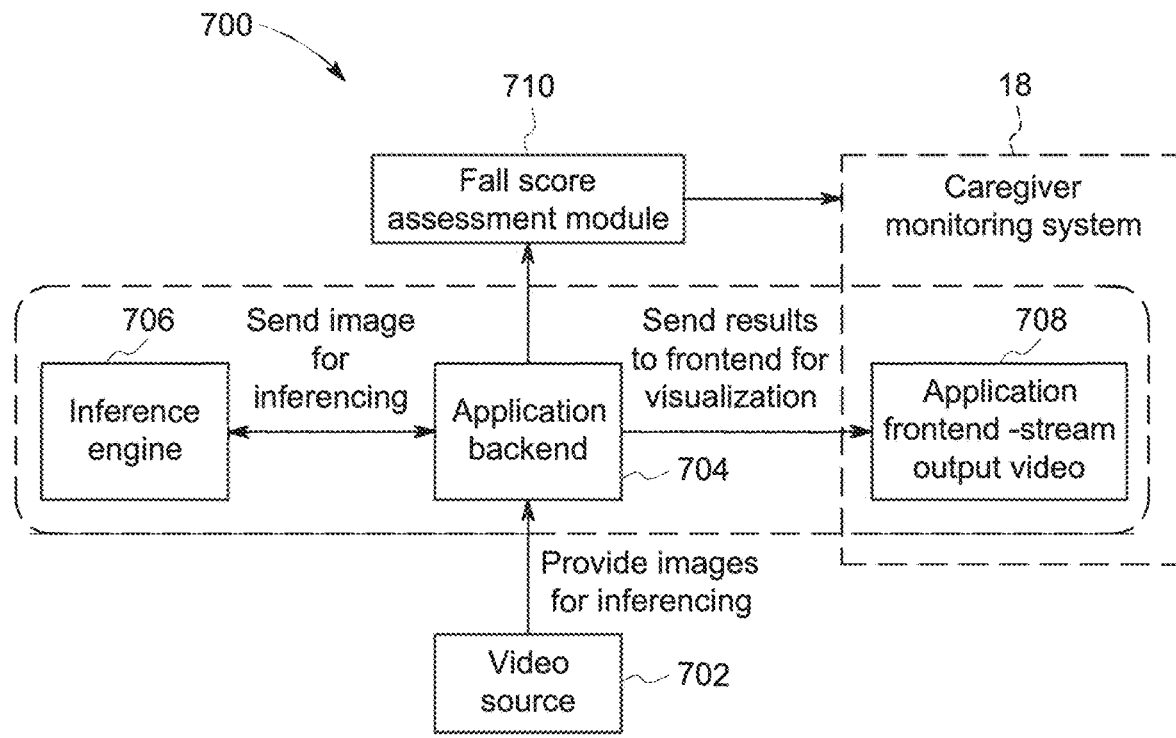
FIG. 15 depicts an exemplary process flow for determining the patient agitation score based on the images of FIGS. 14A and 14B.
Figure 16:
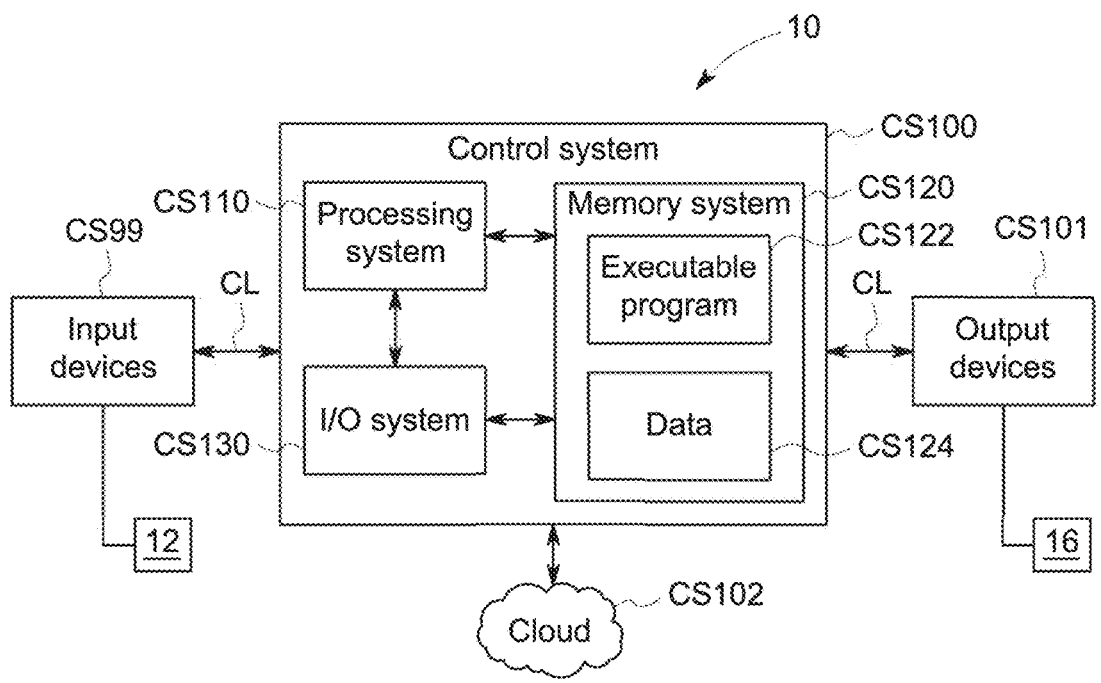
FIG. 16 is an exemplary control system for operating a system according to the present disclosure.

This departure score is compared in step 116 to a threshold, which may be stored as threshold data 118 in a memory system CS120 (see FIG. 16). If it is determined that the departure score does not exceed the threshold, the process returns to step 102. If instead the departure score is determined in step 116 to exceed the threshold, the process 100 provides for generating notifications in step 120, which may take place at the caregiver monitoring station 18 (FIG. 15) and/or in the hospital room itself (for example, audible warnings and/or alarms), and/or automatically adjusting the bed 70. In certain examples, step 122 provides for automatically engaging the rails 82 to move upwardly into the up position when the departure score exceeds a threshold (in addition to, or in place of the notifications of step 120). For example, this may occur when every anatomical part of patient is inside bed, whereby the rails are caused move upward automatically to prevent the patient from falling or moving out.

Figure 5:
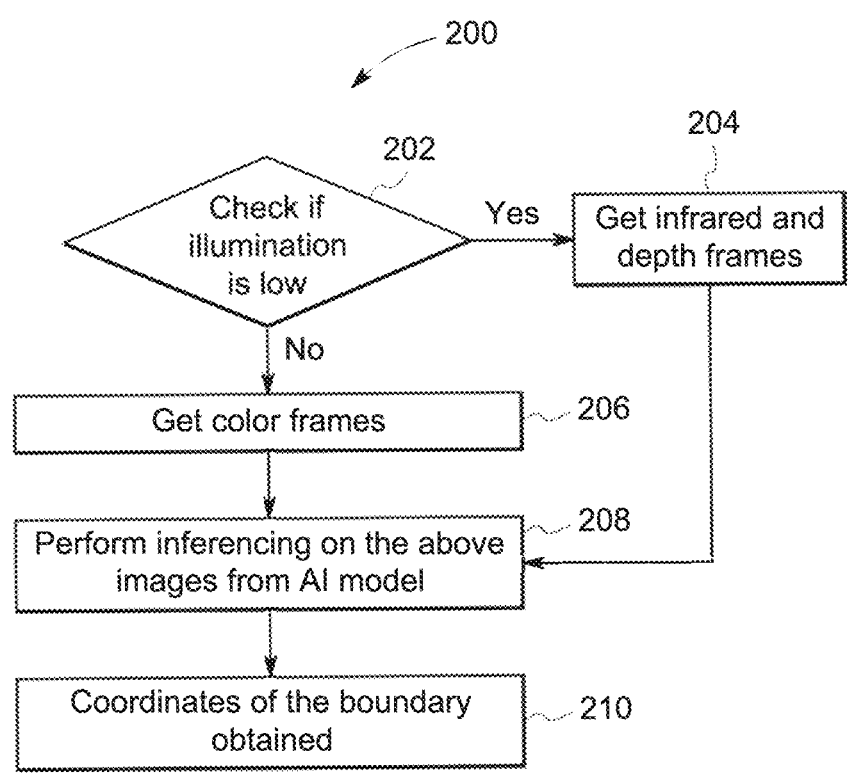
FIG. 5 is a process flow of a sub process as may be incorporated within the process of FIG. 4.

As discussed above, the present disclosure contemplates multiple sub processes for performing step 102 of FIG. 4, namely to identify the boundary B of the bed 70 using data from the camera 12. FIG. 5 provides a process 200 for performing this step 102. The process begins with step 202, which determines if the illumination is low in the room 1 based on the images obtained by the camera 12. If the illumination is determined to be low, meaning that data from color images alone will not be sufficient for identifying the necessary anatomical hotspots P on the patient, boundary B of the bed, and/or other landmarks, the process continues at step 204, which calls for obtaining infrared and depth frames in the data of the camera 12. If the illumination is not low, color frames are obtained at step 206 from the camera 12. Whether using color frames or infrared and depth frames (or both), step 208 provides for performing inferencing on the color frames or infrared and depth frames using artificial intelligence (AI) model. Modeling and comparison may be performed using one or more of the following methodologies/tools: TensorFlow, Keras, Python, OpenCV, Deep Learning, and Computer Vision. This inferenced results from the AI model in step 208 then is used to obtain coordinates of the boundary B of the bed 70 in step 210 of FIG. 4.

Figure 7:
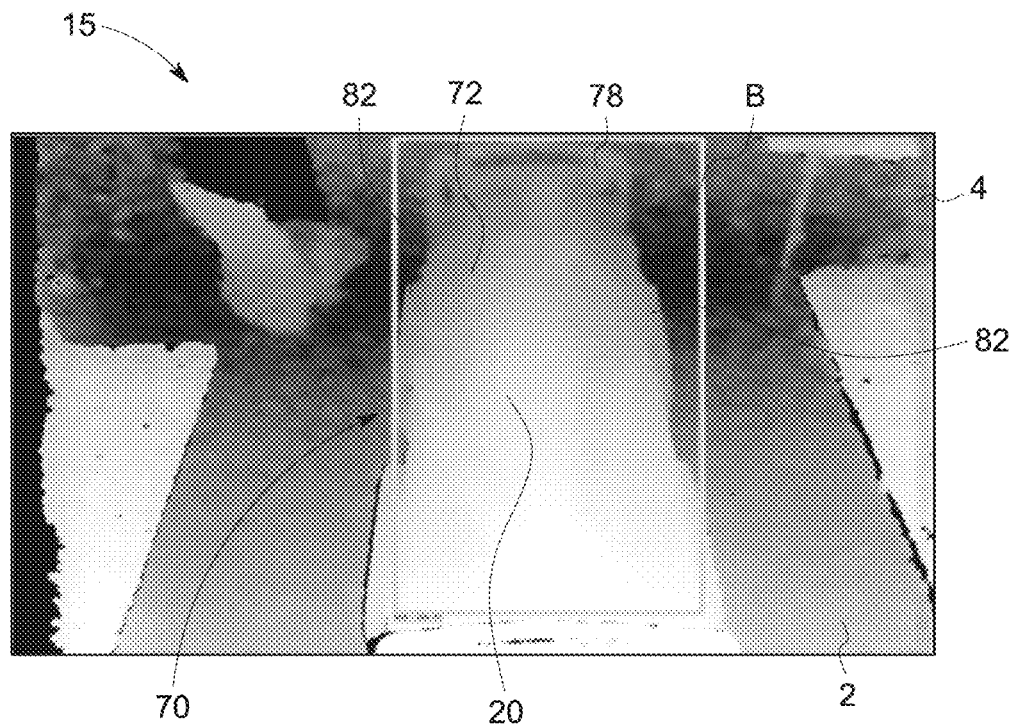
FIG. 7 is an overhead view of images and analysis conducted in executing the process of an alternate embodiment of executing the process of FIG. 5.
Figure 8:
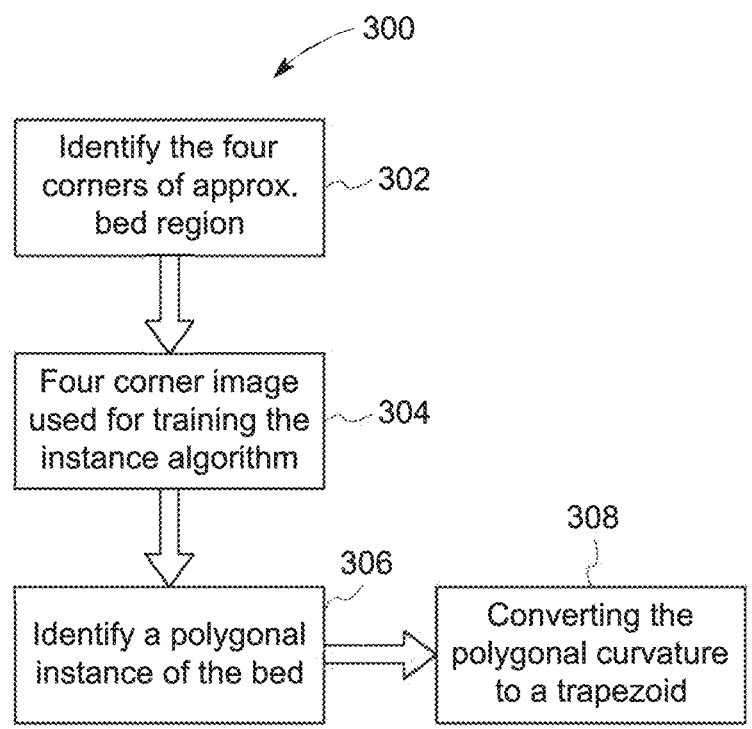
FIG. 8 is a process flow of an alternative sub process to the sub process of FIG. 5 as may be incorporated within the process of FIG. 4.

FIG. 6 depicts an exemplary color frame as obtained in step 206 of the process 200 shown in FIG. 5. In this example, the illumination of the images obtained by the camera 12 are sufficient to identify the corners C of the bed 70, and thus through comparison to images stored in the AI model can be used to determine the boundary B of the bed 70 therefrom (i.e., a first exemplary method of determining the boundary B). In contrast, FIG. 8 provides a method for using infrared and depth frames obtained in step 204 in the process 200 of FIG. 5 (i.e., a second exemplary method for determining boundary B). In this example, the infrared and depth images shown in FIG. 7 are sufficiently clear to successfully identify and correlate the images within the AI model at step 208 to thereby infer the boundary B of the bed 70. Non-AI based methods include a combination of techniques known in the art, such as edge detection of the bed, non-maxima suppression of edges, finding local, maxima and minima of bed curvatures, and gradient geodesic contour of bed area.

In contrast, FIGS. 8 and 9A-9C provide a third exemplary method for determining the coordinates of the boundary B, again using infrared and depth images, shown as process 300. In the process 300 of FIG. 8, step 302 provides for identifying the four corners C of the approximate bed 70 region, whereby the corners C are then used in step 304 for training the instance algorithm corresponding to the presently captured images versus those stored in the AI model. The "instance" algorithm serves to adapt to the modeling to a specific configuration of the room 1, versus the base algorithms relating to generally expected configurations. In certain examples, the bed boundary identification using AI method is a two-fold approach. First, a larger bed boundary is determined by a neural network that approximately identifies the region of the bed in the entire video frame. Second, another neural network takes the larger boundary as an input and generates a curvature-based instance of bed edges and then adapts or fits the curvature instances to the true contours of the bed visible in the depth frames. The distinction between the various curvature segments of the bed and adapting to change in curvature segments is performed by the instance-based segmentation of bed boundary. Once the instance based segment of bed edges is determined, which is closed loop irregular curvature area or boundary, a non-AI based min max localization scheme may be employed to approximate the bed shape and the boundary box to the bed edge that is in trapezoidal shape in reality.

Figure 9C:
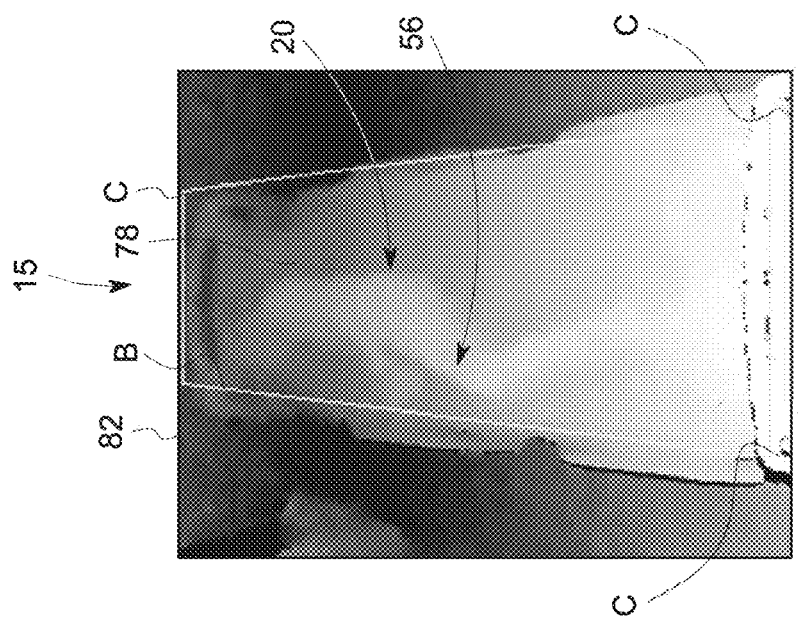
FIGS. 9A-9C depict images and analysis conducted in performing the sub process of FIG. 8.
Figure 9B:
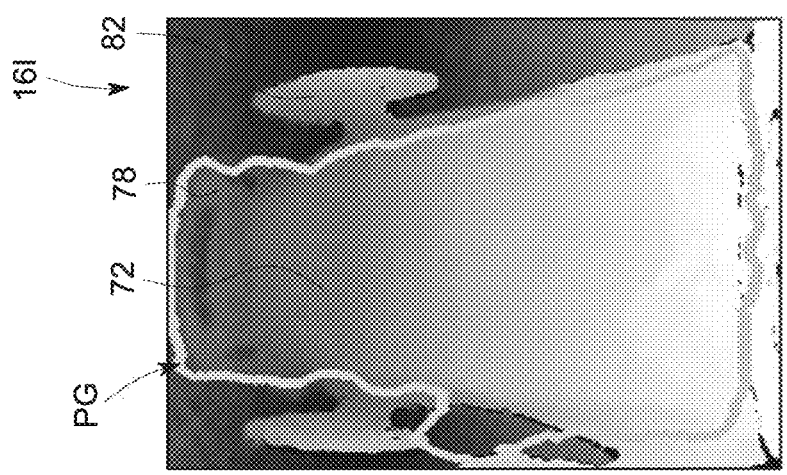
Figure 9A:

Step 306 provides for identifying a polygonal instance of the bed, which is then converted to a trapezoid in step 308. FIG. 9A depicts an exemplary depth frame 16D as from the camera 12. In the depth frame 16D shown, a first region R1 (here, the darkest portion shown in black) corresponds to data obtained at a first distance, here corresponding to the floor of the room. This is in contrast to a second region R2 corresponding a detected distance that is a substantially closer to the camera 12 versus that of the first region R1. Here, the second region R2 is presumed to correspond to the bed 70, based on its positioning within the frame, distance from the camera 12, and/or general shape. A sharp contrast between first region R1 and the second region R2 allows the system 10 to identify a polygon PG corresponding to the general outline of the bed 70. FIG. 9B then shows an overlay of this polygon PG determined on the infrared frame, IR frame 16I, which can be used to further identify other features of the bed 70, such as rails 82 and a head board 78. A trapezoidal boundary B is computed in the combined IR and depth frame 15 as shown in FIG. 9C. This example, the combination of IR and depth data in the IR depth frame 15 not only provides for confirmation of the proper trapezoidal shape of the boundary B from the bed 70, but can also be used to identify the patient 20 lying therein.

Figure 10:
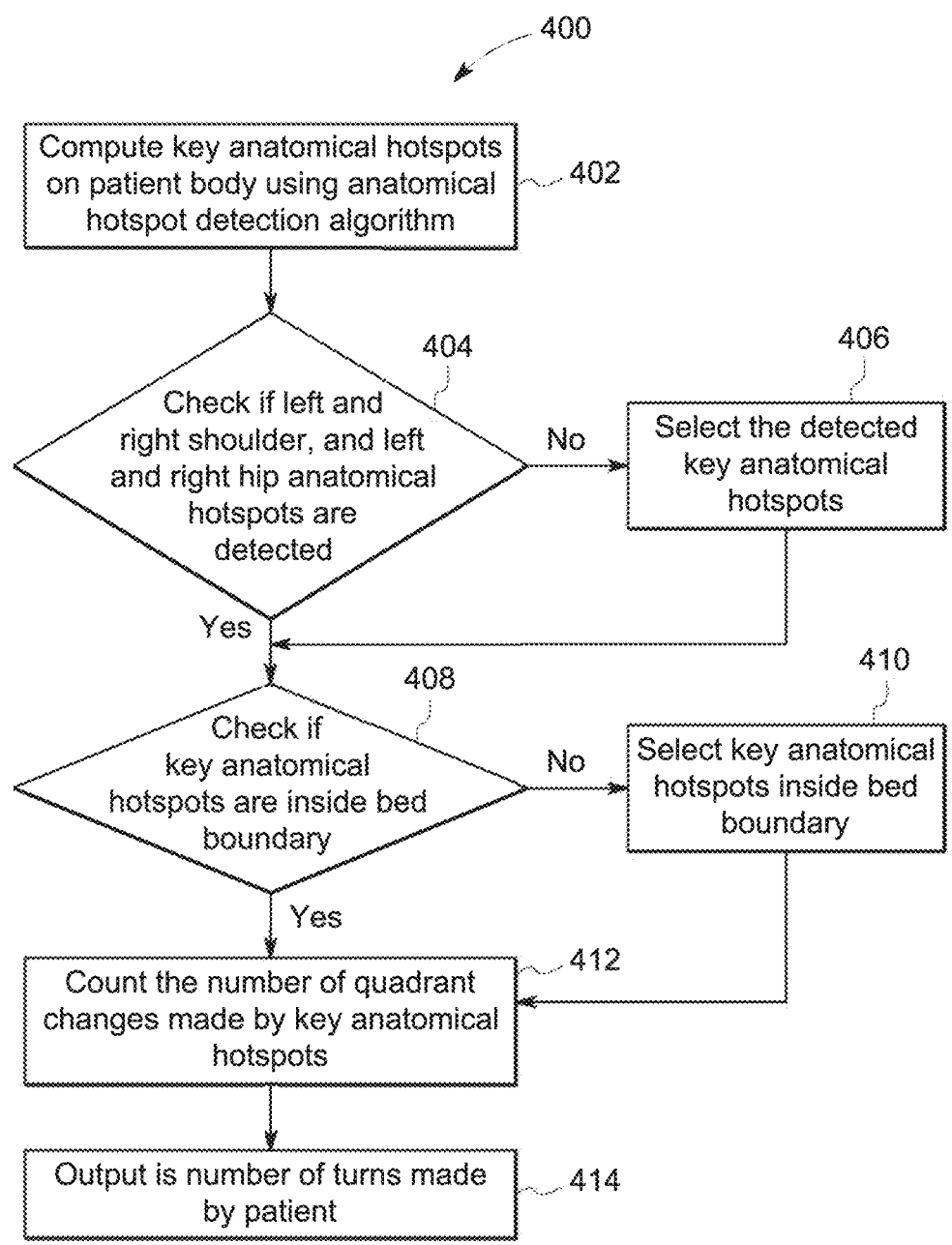
FIG. 10 is a process flow for determining a number of turns such as may be performed using the image and analysis of FIG. 3.

FIG. 10 provides more details for an exemplary process 400 for determining the number of turns for a patient 20 in the bed 70, which as discussed above may serve as the first input 91 to the fall score assessment module 95 for determining a departure score (FIG. 2). Step 402 begins with computing or identifying key anatomical hotspots P on a patient 20 using the inventors' own proprietary anatomical hotspot detection algorithm. Step 404 provides for determining whether left and right shoulders 54 have been identified among the anatomical hotspots P visible for the patient 20. If not, alternate anatomical hotspots P which are detected as P are considered for the patient 20 in step 406 (left hip, right hip, left knee, right knee). The process then continues to step 408, whereby the system 10 determines whether the anatomical hotspots P selected are inside the boundary B previously identified by one of the methods described above. If these hotspots P are not identified as being within the bed boundary B, alternate hotspots P that are inside the boundary B are identified at step 410. The process continues with step 412, which monitors and counts the number of quadrant changes made by the considered anatomical hotspots P. The output of this number of turns counted is provided in step 414, which may be used in the process 100 of FIG. 4 for computing the departure score.

Figure 11:
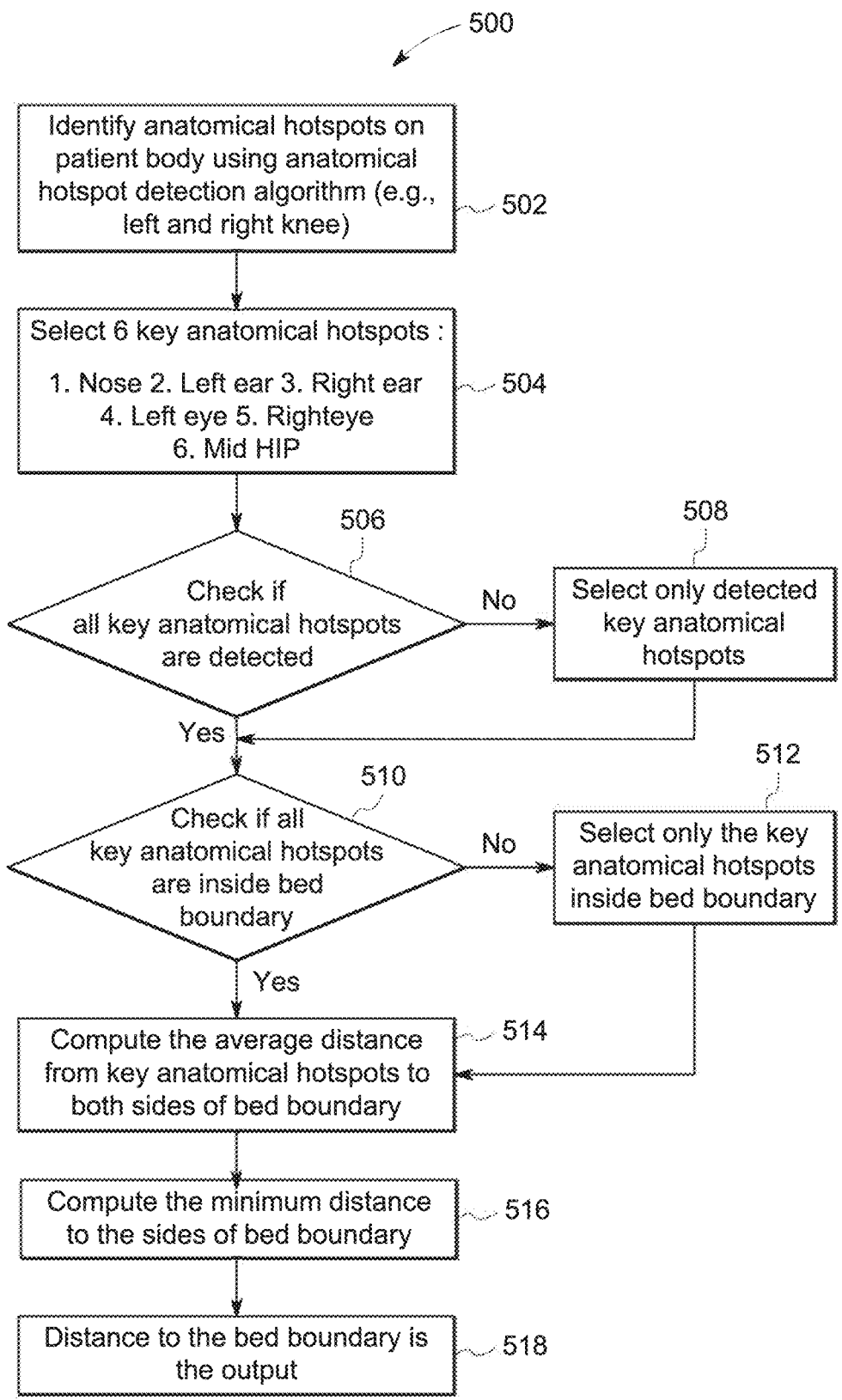
FIG. 11 is a process flow for determining a distance from the patient to the edge of the bed such as may be performed using the image and analysis of FIG. 3

FIG. 11 provides exemplary method 500 for determining a distance between key anatomical hotspots P of the patient 20 and the edge of the bed, denoted as the boundary B, which as shown in FIG. 2 may be used as the third input 93 to the departure score assessment module 95 for determining a departure score. In step 502, key anatomical hotspots P are identified on the patient 20, for example in the same manner as step 402 as described above. In the exemplary step 504 of FIG. 11, anatomical hotspots P are identified: the nose 26, left ear 30L, right ear 30R, left eye 32L, right eye 32R, left knee, right knee, left shoulder, right shoulder and hip 60. However, it should be recognized that greater or fewer points P may be used in step 504. These anatomical hotspots P may be identified using various modeling techniques, for example.

Step 506 then determines if all hotspots P selected for identification have been detected in the images provided by the camera 12. If not, only the anatomical hotspots P detected in the images are used in step 508. The process then continues by determining in step 510 whether all the hotspots P selected and detected in the images are also inside the boundary B of the bed 70. If not, step 512 provides for using only those hotspots P that have been identified to be within the boundary of the bed 70. The process then continues at step 514, which provides for calculating the average distance between the anatomical hotspots P identified as being inside the bed boundary B to both sides of the bed boundary B (also referred to as the distance to edge DE for these points P). The minimum distance to the sides of the bed boundary B is determined in step 516, or in other words is determined which side the bed boundary B the patient 20 is closest to, which is outputted in step 518, for example serving as the third input 93 in FIG. 2.

Figure 12:
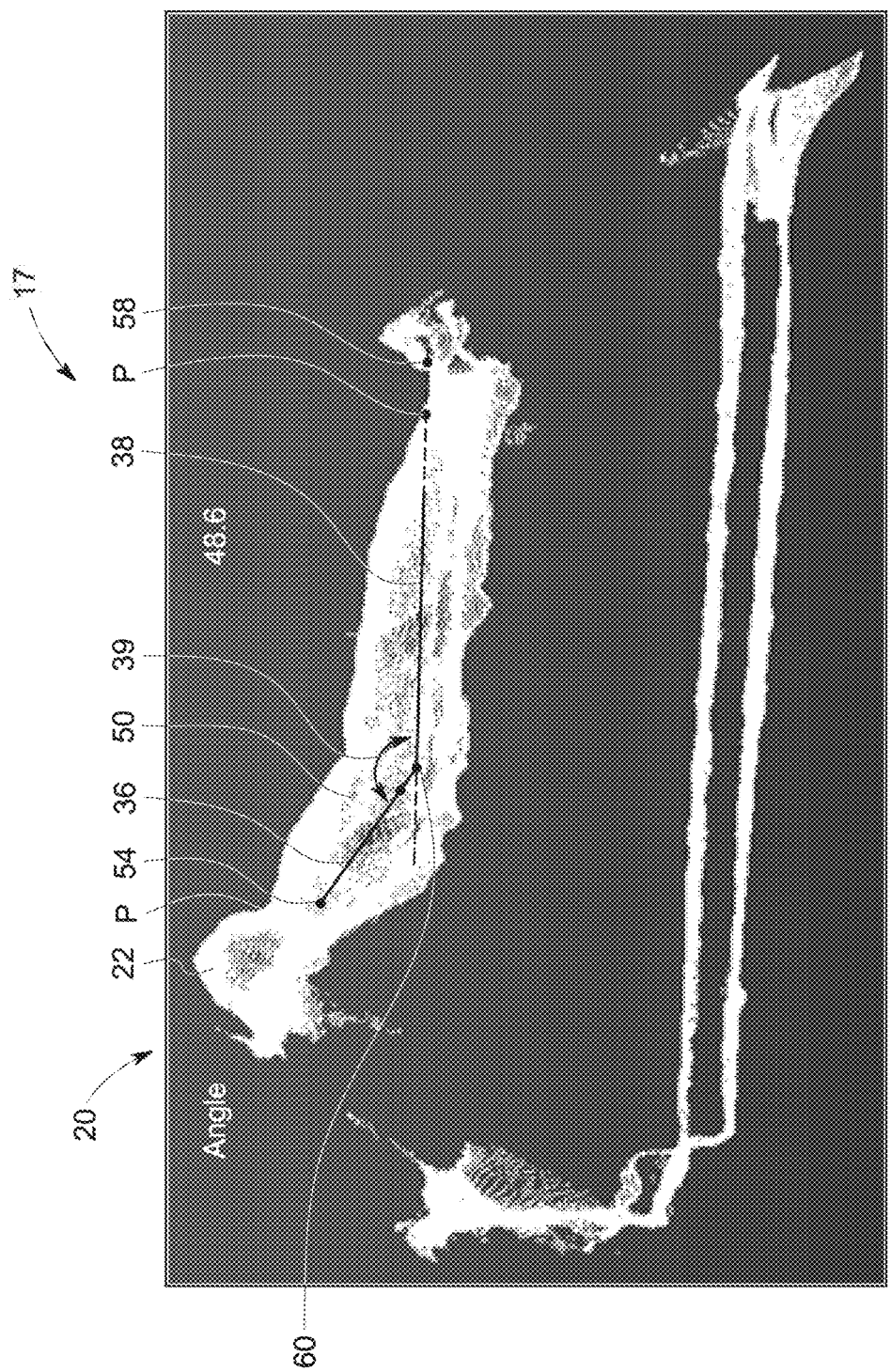
FIG. 12 is an exemplary point cloud model as used for determining the orientation of the patient according to the present disclosure.

FIG. 12 depicts a model 17 created for determining the patient orientation within the bed 70, for example as the second input 92 to the departure score assessment module 95 of FIG. 2. In addition to determining whether the patient 20 is in a supine, prone, left side, or right side position as described above, the second input 92 of FIG. 2 may further incorporate whether the patient 20 is lying or sitting in the bed 70. FIG. 12 depicts an exemplary point cloud as the model 17 generated by the images produced by the camera 12, for example using a patient model generated through a filtered point cloud technique as discussed above. This filter point cloud is generated with depth frames, by measuring distance between the camera and each point on the patient's body. Once the camera-based point cloud is generated, it is converted to world coordinates system for further computation and processing. This includes mapping camera coordinates to physical real word co-ordinates In the example shown, the system 10 provides for identifying an upper body segment 36 and a lower body segment 38 based on anatomical hotspots P identified for the patient 20. For example, the upper body segment 36 is defined to extend between the shoulder 54 and the mid-hip 60, whereas the lower body segment 38 extends from the hip 60 to the foot 58, for example. A torso angle 39 can then be determined as the angle between the upper body segment and lower body segment 38. The system 10 may then determine whether the patient 20 is sitting or lying based on this torso angle 39. For example, the system 10 may be configured to determine that the patient 20 is laying down whenever the torso angle 39 is less than or equal to 45 degrees.

The present inventors have recognized that this determination of whether the patient 20 is laying down or sitting up is highly informative as the risk for falling (or otherwise exiting) is greater when the patient is sitting up. For example, sitting up indicates that the patient is awake and thus may decide to reach for an object outside of the bed 70 (losing their balance and falling), and/or may attempt to exit the bed 70. As such, a determination that the patient 20 is sitting up results in a higher departure score than lying down, for example.

Figure 13:
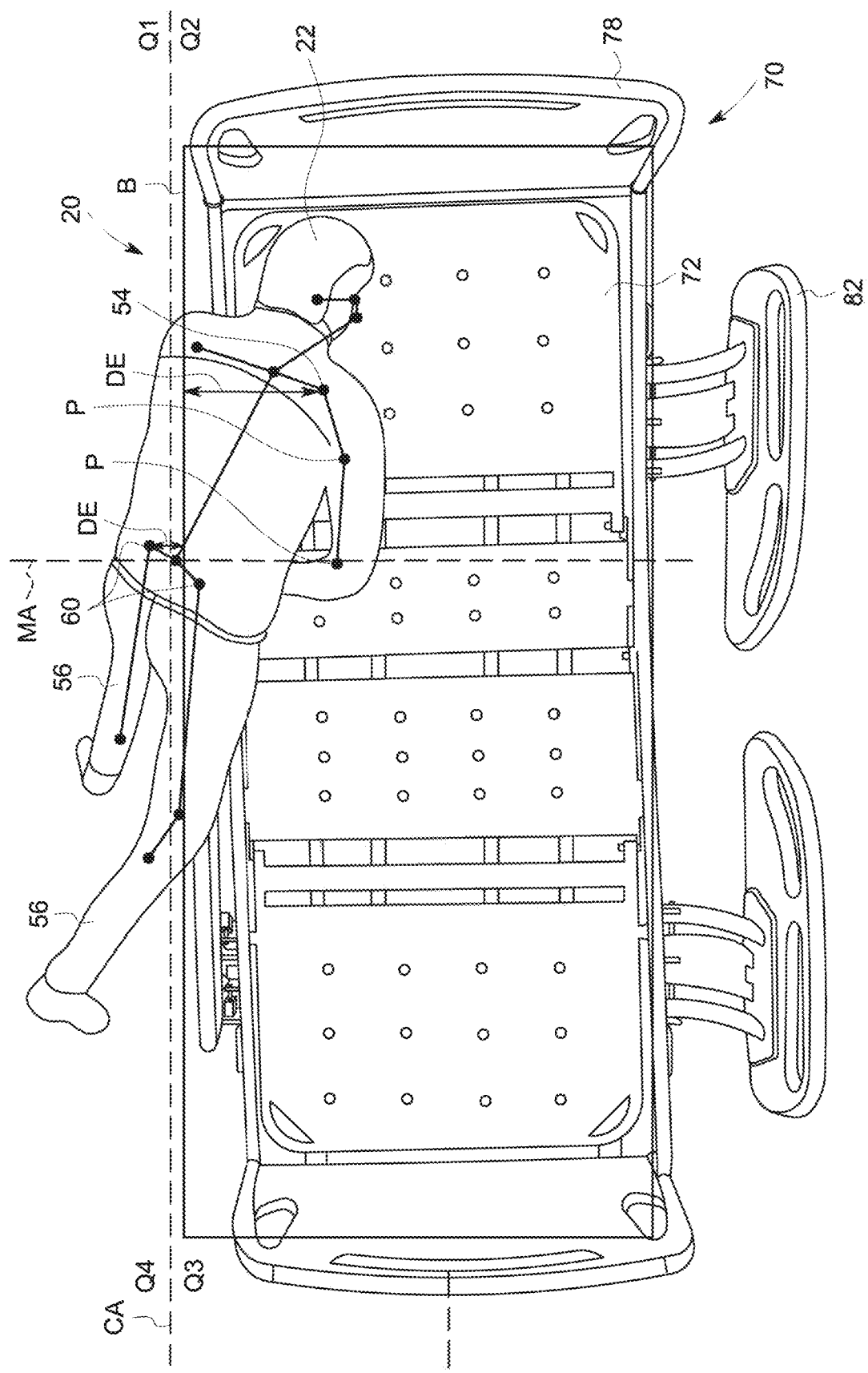
FIG. 13 is an overhead image depicting a departure event as detected using a system according to the present disclosure.

FIG. 13 depicts an image captured from the camera 12 and a corresponding process 600 for identifying a departure event for the patient 20. The process 600 provides for obtaining camera frames in step 602, which are fed into the departure score assessment module in step 604. In the image shown in FIG. 13, the distance to edge DE for the point P corresponding to the patient's left hip 60 is shown exceeding the boundary B, meaning that that point P is no longer inside the boundary B. This information is then interpreted to mean that the patient 20 has departed the bed 70. In certain examples, the departure score is determined using a heuristic approach via an algorithm that includes the following as inputs: a number of patient turns within the bed boundary, Hausdorff and/or Euclidian distances between key anatomical points, changes in the orientation (as determined through a deep net based on pose classification) and position of the patient (e.g. between sitting and lying down, determined by the point cloud structure of patient), mapping the patient plane to bed plane, and an agitation score. As discussed further below, agitation scores are used for predicting the emotional state and/or comfort level of the patient, for example by determining the angles of facial features such as the eyebrows and the curvature around the mouth.

It should be recognized that other hotspots P may be used for assessing whether the patient 20 has, or is close to departing the bed 70. The present inventors have recognized that certain anatomical hotspots P are not as effective as others for indicating a departure simply for being outside the boundary B, such as a hand or foot versus a hip 60. However, a foot being outside the boundary B may nonetheless present a higher indication of departure than a hand, for example. Likewise, a knee may be more indicative of departure than a foot, and a shoulder more indicative than a hand, for example, which may all be stored within the departure score assessment module for determining the departure score. Other considerations include the location of other hotspots P within the bed 70 when a given hotspot P is determined to be outside the boundary B. For example, a hand being outside the boundary B may be more indicative of the patient 20 falling or otherwise exiting the bed 70 if the shoulder 54 (while remaining within the boundary B) has a distance to edge DE below a given threshold (e.g., within 6 inches or 1 foot) as opposed to the patient 20 being otherwise centered at the center axis CA.

Figure 14A:
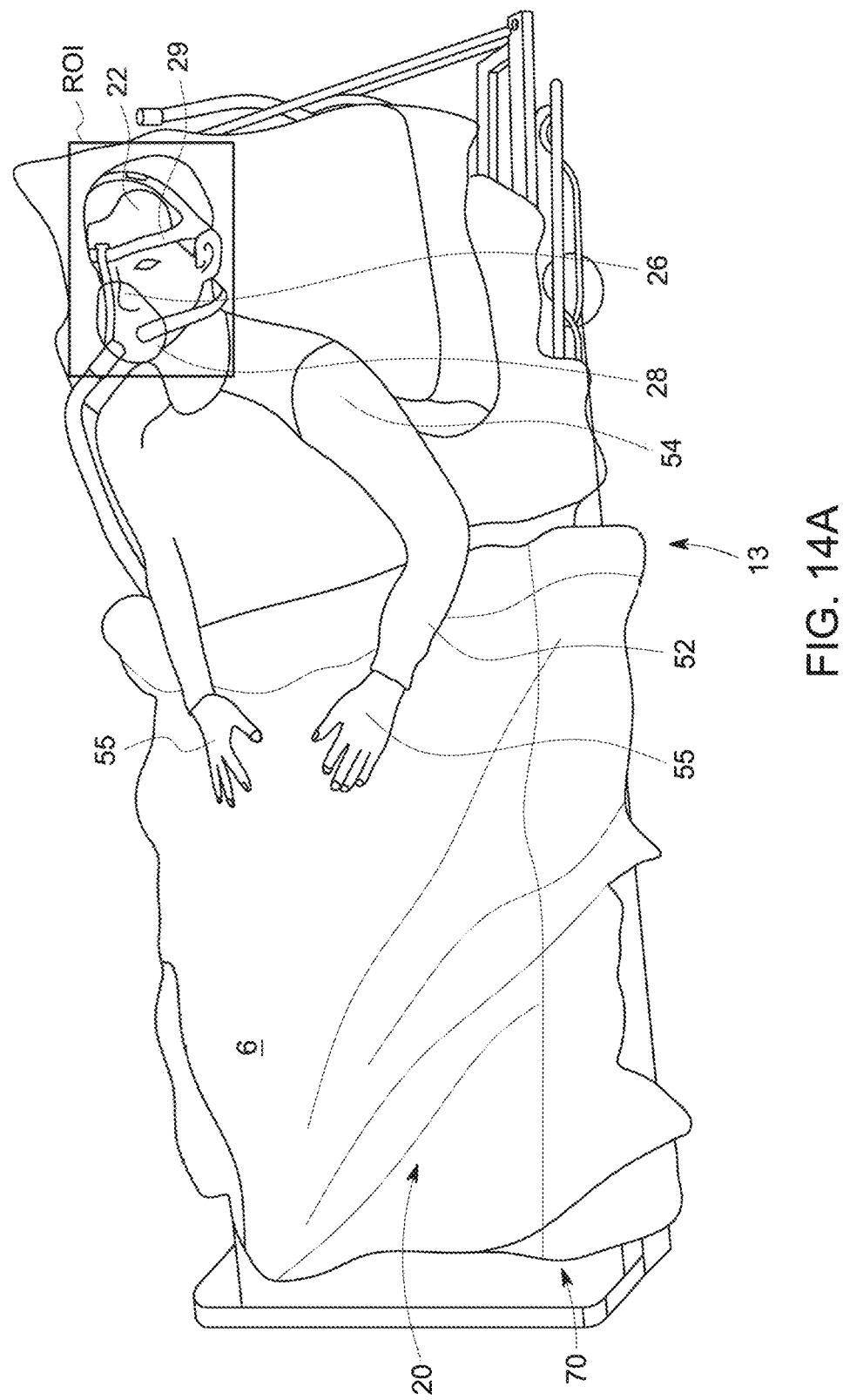
FIGS. 14A and 14B are perspective views of a patient and analysis used for determining a patient agitation score such as shown in FIG. 2.
Figure 14B:
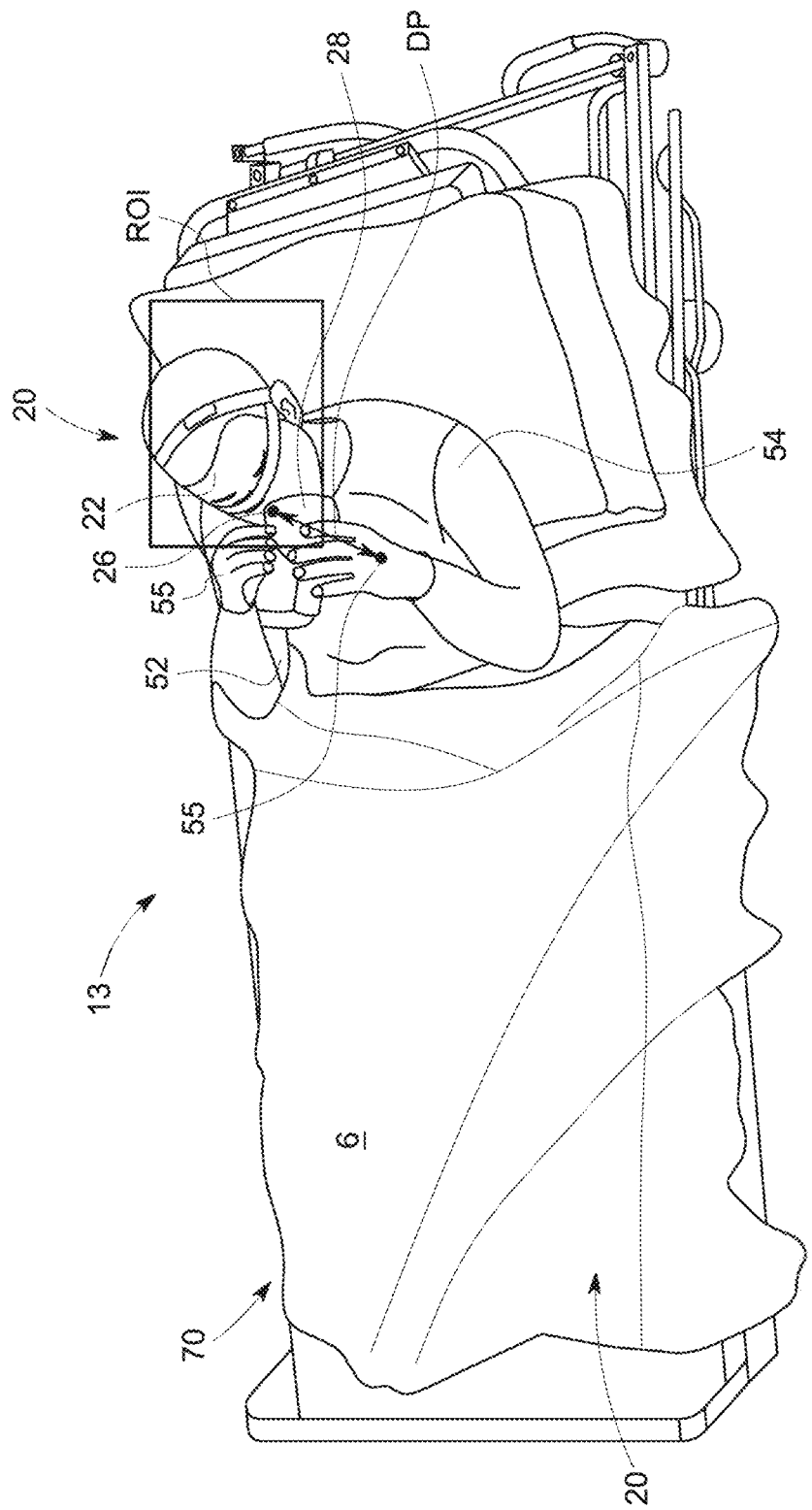

FIGS. 14A and 14B provide additional information for determining a patient agitation score, which may be provided as a fourth input 94 to the departure score assessment module 95 of FIG. 2. The present inventors have identified that a patient's agitation, often caused by emotional or physical discomfort, can be ascertained by analysis of the facial expression and impacts the likelihood of that patient moving, reaching, or trying to exit the bed 70. In certain examples, the agitation score is determined via a comparison of six (for example) different deep learning based computer vision algorithms (developed on the given architectures as a backbone): Mobilenet V2 algorithm, Inception V3 algorithm, VGG-16 algorithm, CNN algorithm, YOLOV3 algorithm, and/or RetinaNet algorithm. In certain examples, the best working model of all these is selected depending on condition of the patient. Using one of more of these algorithms, the system 10 then determines the agitation score by performing one or more of: detecting the orientation of the patient (e.g., laying versus sitting up), detecting whether the eyes and/or mouth of the patient 20 are open, detecting facial expressions of the patient 20 (e.g., eyebrow positions, mouth positions), detecting movement of the patient 20, detecting if the patient is wearing a face mask, and detecting if the face mask is being worn correctly if present (e.g., the nose and mouth should not be visible). It should be recognized that these masks may also be oxygen masks or other types of masks, such as cloth coverings frequently worn to prevent the spread of the COVID-19 virus, for example. Separate agitation score calculations may then be performed depending upon whether or not a mask is detected (for example prioritizing hotspots P of the patient not covered when a mask is present).

In the example of FIG. 14A, the patient 20 is determined to be resting in a non-agitated position with a non-agitated facial expression as compared to models stored in memory. Specifically, the hands 55 have been identified as being in a down or resting position, with the patient's shoulders 54 also resting on the bed 70.

In this example, a mask 96 has been identified as being positioned on the head 22 of the patient 20, for example through comparison to deep learning or AI modeling. Consequently, the weighting for features that remain visible (e.g., the left eye 32L, right eye 32R, left eye brow 34L, and right eye brow 34R, forehead, visible part of checks) may be increased versus conditions in which no mask 96 is present (which may then also consider a shape of the mount and other features). As such, in the exemplary image of FIG. 14A the agitation score may be relatively low, for example 1.66 on a normalized scale of 1-100, as it appears that the patient 20 is resting peacefully.

In contrast, FIG. 14B shows the patient 20 sitting up, which among other things may be identified by observing that the shoulders 54 are now in a upward position relative to the bed 70. Likewise, some of these facial features of the patient 20 have different distances between hotspots DP there between now that the face is not normal to the camera 12. In other words, the distance between hotspots DP between the eyes and the nose decreases when the patient 20 sits up versus is laying down, given the downward angle of the camera 12. Agitation can then be assessed by analysis of the visible facial features, just as when the patient 20 was lying down.

In certain examples, the agitation score is determined by deriving feature a vector of critical patient regions (e.g., the eyes, eye brows, or around the mouth). This includes estimation of whether the patient is wearing an oxygen mask through region-based shape detection scheme. Once the shape of the oxygen mask is determined, the contours of the shape are computed, followed by computing the area enclosed within the close loop contour using geodesic shape based are computation technique. The area of the oxygen mask is then mapped to the depth frame (after subtracting out the background in a manner known in the art and described herein). This helps to retain the depth (f(Z)), and pixel values (f(x,y) of the mask region. These values are then normalized based on the camera tilt angle, and/or an offset between the center of the oxygen mask center and the center of the patient's now, as well as between the center of the oxygen mask and the center of the patient's forehead. This is considered as entity A.

Next, the angles made by the eyebrows, cheek, forehead curvatures are computed using a curvature identification-based deep neural network, through which the local maxima, minima, gradient, and degree of inclination are derived. These values are then fed to a deep neural network to predict the agitation index. The agitation score is then computed by adding the agitation index to the entity A, then dividing the sum obtained by the frequency of motion induced in patient arms and legs (as described in the present disclosure). The motion is determined through a pixel difference approach from one camera frame to another.

The system 10 may be further configured to recognize and consider that the hands 55 are also in close proximity to the nose 26, indicating that the patient is generally uncomfortable (e.g., rubbing eyes, adjusting a mask 28 or a strap 29, etc.).

Using the inputs discussed above, the departure score assessment module 95 outputs a departure score that is within a range from 1-100, with 100 indicating an actual departure is occurring or has occurred. In certain examples, the predetermined threshold for generating a notification is X out of 100 and the threshold for adjusting the bed or engaging the rails is X out of 100. In certain examples, the departure score is predicted every 60 frames of imaging data, which in the example of a 30 fps camera 12 (shown as a video source 702 in FIG. 15) would be once every 2 seconds, for example. The departure score prediction may be provided as a function of:

the number of turns determined as the first input 91 (predicted every 60 frames of imaging data, which in the example of a 30 fps camera would be once every 2 seconds)

changes in position (e.g., as determined over approximately 2 seconds)

changes in orientation (e.g., as determined over approximately 2 seconds)

a minimum average Hausdorff and/or Euclidean distance between the hotspots P of the patient 20 and the boundary B of the bed (e.g., the closest that the patient is to the edge, using the distance to edge DE measurements discussed above as the third input 93), the agitation score as discussed above for the fourth input 94

In this manner, a departure score is determined every approximately 2 seconds.

FIG. 15 further depict this process 700, whereby for example anatomical hot spots are mapped to a blanket or another obscuring item (e.g., baggy clothing) via elements 704, 706, and 708 as described above. In this manner, a departure score is determined every approximately 2 seconds via the fall score assessment module 710 as discussed above.

FIG. 16 depicts an exemplary control system CS100 for performing the methods of the present disclosure, or executing instructions from a non-transitory medium to predict and/or prevent for preventing patient falls from a bed according to the present disclosure. It should be recognized that certain aspects of the present disclosure are described or depicted as functional and/or logical block components or processing steps, which may be performed by any number of hardware, software, and/or firmware components configured to perform the specified functions. For example, certain examples employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

In certain examples, the control system CS100 communicates with each of the one or more components of the system 10 via a communication link CL, which can be any wired or wireless link. The control module CS100 is capable of receiving information and/or controlling one or more operational characteristics of the system 10 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the system 10. Moreover, the communication link CL lines are meant only to demonstrate that the various control elements are capable of communicating with one another, and do not represent actual wiring connections between the various elements, nor do they represent the only paths of communication between the elements. Additionally, the system 10 may incorporate various types of communication devices and systems, and thus the illustrated communication links CL may in fact represent various different types of wireless and/or wired data communication systems.

The control system CS100 may be a computing system that includes a processing system CS110, memory system CS120, and input/output (I/O) system CS130 for communicating with other devices, such as input devices CS99 and output devices CS101, either of which may also or alternatively be stored in a cloud CS102. The processing system CS110 loads and executes an executable program CS122 from the memory system CS120, accesses data CS124 stored within the memory system CS120, and directs the system 10 to operate as described in further detail below.

The processing system CS110 may be implemented as a single microprocessor or other circuitry, or be distributed across multiple processing devices or sub-systems that cooperate to execute the executable program CS122 from the memory system CS120. Non-limiting examples of the processing system include general purpose central processing units, application specific processors, and logic devices.

The memory system CS120 may comprise any storage media readable by the processing system CS110 and capable of storing the executable program CS122 and/or data CS124. The memory system CS120 may be implemented as a single storage device, or be distributed across multiple storage devices or sub-systems that cooperate to store computer readable instructions, data structures, program modules, or other data. The memory system CS120 may include volatile and/or non-volatile systems, and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

The present disclosure further relates to detecting and preventing collisions by patients, whether in bed or out of the bed, which the present inventors have recognized are additional, serious, and common safety problems in hospitals and other care facilities. Like patient falls as discussed above, the additional care required for patients who have sustained a collision are substantial, nearly fourteen thousand dollars greater than patients who have not been involved in a collision, and between eighty and ninety percent of collisions are generally unobserved. Due to the nature of the problem, developing and accurate and robust real-time method to detect and prevent these patient collisions is a major challenge that is presently unsolved in the art. In addition to detecting and preventing collisions when a patient is both in bed and out of bed, it will become apparent that the collisions of concern are between a patient and other humans, whether other patients, caregivers, family, or friends and collisions between patients and objects in room, such as the bed, furniture, and/or medical equipment.

As will also become apparent, some of the teachings discussed in the context of departure scores (fall or exit) may be used in the process of detecting and avoiding collisions, and vice versa. One distinction the present inventors have noted that may be present in the circumstances surrounding the application of detecting and avoiding departures versus detecting and avoiding collisions are that in the case of departures, and particularly falls, the patient is often in a subconscious state, leading to unintentional and/or less coordinated movements than typical, as discussed above. In contrast, collision detection and avoidance may be particularly applicable where a patient is conscious and thus more active, moving about in the room and thus increasing the risk for collision with other people and objects therein. However, it should be recognized that collision avoidance and departure avoidance may be applied for patients of any conscious state.

In certain examples for collision detection and avoidance according to the present disclosure a deep learning model and technique is used to identify a risk of a patient colliding with other people or objects, which can be provided to caregivers for observation of the patients, for example to monitor multiple patients from a single remote location. As discussed above, many if not most of the activities taking place in the hospital or other care facility occur around a bed, and thus the patient spends much of their time in bed. As such, detecting the patient bed is one of the components of collision detection, which may be performed using one of the techniques previously discussed above with respect to departure scores. It will be recognized that similar techniques will also be used to identify other objects within the room, including furniture and medical equipment, as well as other people.

The present inventors have further identified that it is advantageous to continuously monitor and automatically a pose or orientation of the patient while in bed, which exists in the process of predicting and avoiding collisions in a similar manner to that discussed above in respect to departures from the bed. In certain examples to be discussed below, the patients orientation is classified into one of four classes; supine, prone, left-lateral, and right-lateral.

As will be discussed further below, the presently disclosed systems and methods are configured to automatically detect the bed boundary, without requiring the caregiver to manually mark the of the bed. This process is time-consuming, prone to error, and subject to change, as the location of the patient bed can change from time to time. This can be because of multiple reasons, such as caregivers performing their cleaning duties on the patient or the bed could have been shifted, when the doctors are doing regular checkup. Also, it would be time consuming for the caregivers to manually mark the bed boundary and update the system whenever the location of the bed changes. Additionally, the present inventors have identified that outdated or otherwise incorrect bed labeling can lead to errors in the performance of the system, potentially leading to patient injury. Thus, accurate and automatic detection of patient bed boundary is a challenge solved by the present disclosure, including with AI based techniques.

Patient orientation or in-bed pose and posture are significant health-related metrics with potential values in a lot of medical applications, such as sleep monitoring. Symptoms of many diseases such as pressure ulcers, sleep apnea, and even carpal tunnel syndrome are affected by sleeping pose. After certain major surgeries to get better recovery results, patients in intensive care units are usually required to maintain specific orientation/poses, specifically during pregnancy since certain sleeping poses can cause harm to both the fetus and mother. Therefore, continuous monitoring and automatically detecting in-bed poses is a major challenge and is of critical interest in healthcare in the current times. Another major challenge recognized by the inventors in automating monitoring processes is the notable difference in lighting conditions throughout the day which impacts the quality of live video of patient.

Identifying whether patient is in sitting or sleeping position also plays a very crucial role in determining patient's condition and there is higher probability that a patient sitting will fall. The patient may also be at some intermediate angle between sitting and sleeping an inclined bed, which the present inventors have identified further complicates the determination of whether the patient is sitting or lying down.

Patient falls are a serious and common patient safety problem in hospitals and other care facilities. Approximately one-fourth of 2 to 3% of hospitalized patients who experience restlessness and safety and fall each year (i.e approximately one million falls) in USA get injured severely. The cost of extra care for the falling patients is nearly $14,000. Almost 80-90% off falls in hospitals are generally unobserved. So, developing an accurate, robust real time method to prevent these patient falls is a challenge. Also providing an adequate lead time for attenders of a patient to predict the restlessness and safety score and prevent fall is also a major challenge. So, we have invented a novel method solving the above challenges of monitoring patients for restlessness and safety in real time. This method provides an ability to predict patient restlessness and safety and predict patient fall with an adequate lead time for a response, and there by potentially allowing nursing staff time to prevent a fall.

Figure 17:
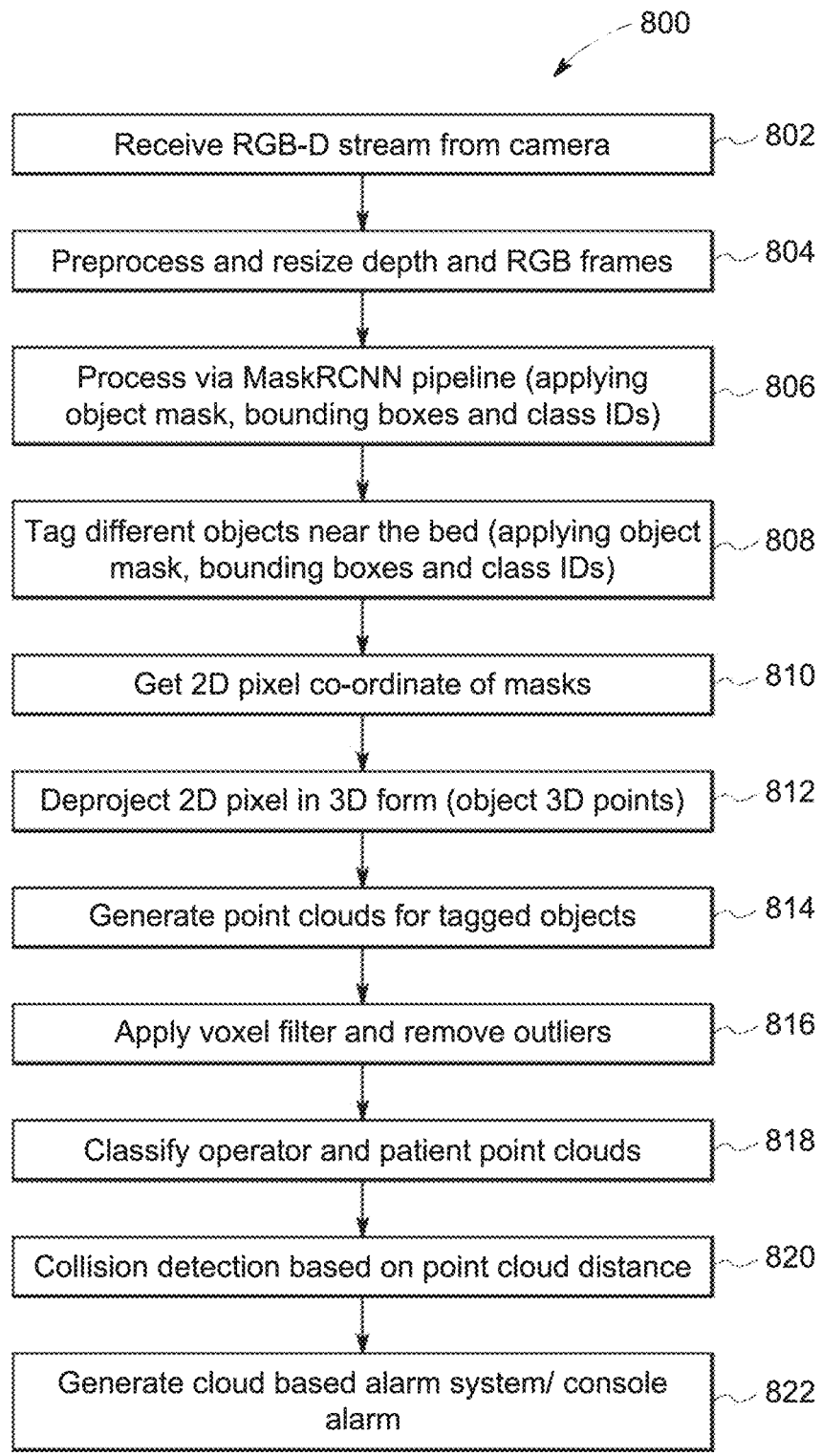
FIG. 17 is an exemplary process for detecting and preventing a collision by a patient according to the present disclosure.

FIG. 17 depicts and exemplary process 800 for detecting and preventing a collision of a patient according to the present disclosure. While a process 800 is described at a high level here, additional detail for each of the sub steps is provided below. The process begins at step 802, which includes receiving an RGB-D stream from a camera in the manner previously described above. In the example shown, step 804 calls for pre-processing and resizing the depth and RGB frames received in step 802, which is discussed further below and shown in FIGS. 18-19. The outputs are then processed via a MaskRCNN pipeline, whereby an object mask, bounding boxes, and class IDs are applied in a manner further described below.

Step 808 then provides for tagging different objects near the bed, again applying objects masks, bounding boxes, and class IDs as identified in step 806, which is generally shown in the image data 1010 of FIG. 20A and discussed further below. Step 810 provides for obtaining the 2D pixel coordinates of the object masks, which are deep projected into 3D form in step 812, in other words generating an object having 3D points. From here, step 814 provides for generating point clouds for the tagged objects (as shown in the image data 1020 of FIG. 20B and discussed below), whereby a voxel filter is then applied an outlier points removed in step 816.

Figure 22:
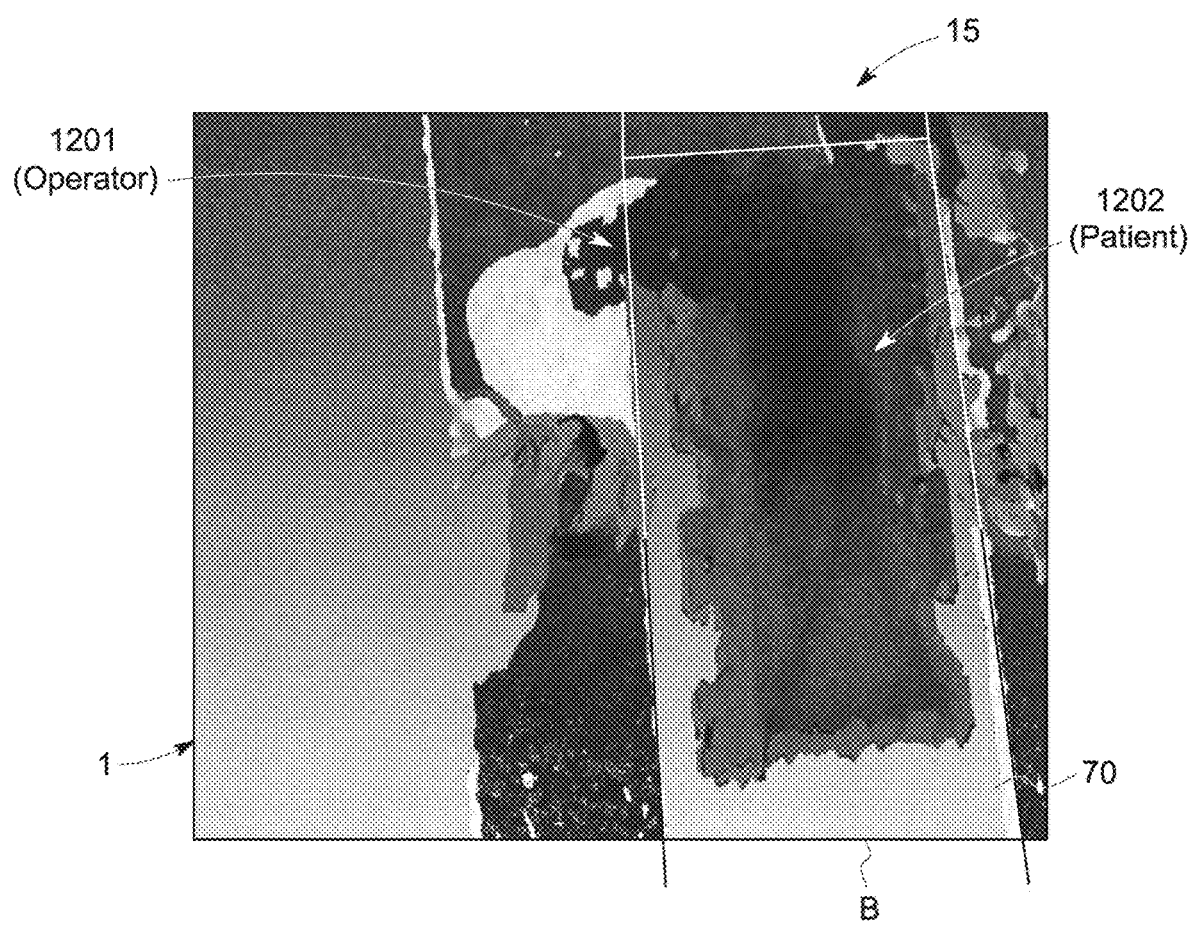
FIG. 22 shows objects within an image classified as patient and operator according to the present disclosure.
Figure 23:
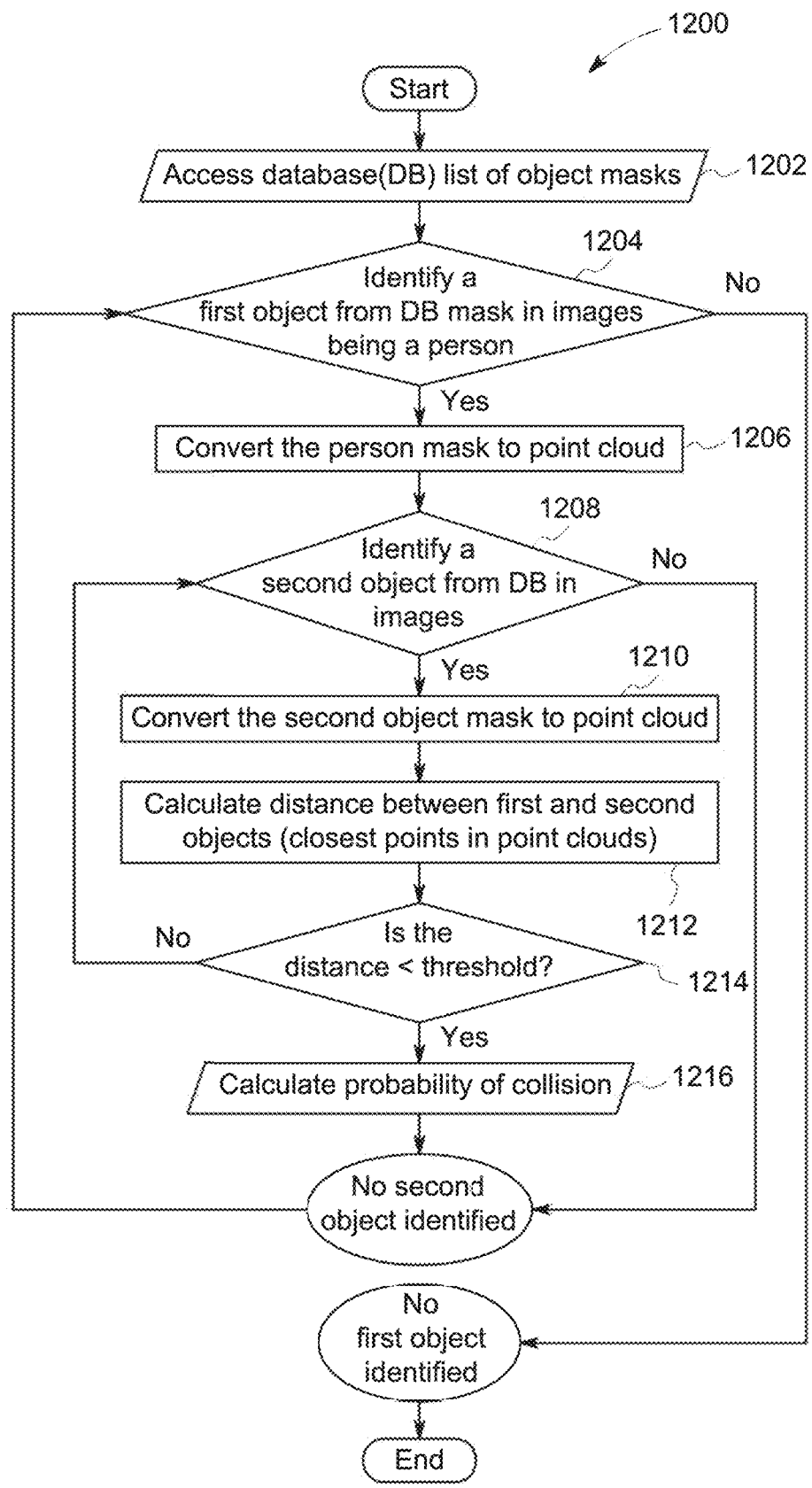
FIG. 23 is another exemplary process for detecting and preventing a collision by a patient according to the present disclosure.

The operator (or caregiver) and patient are then classified in the point clouds in step 818, shown in FIG. 22 and discussed below, allowing for collision detection to be performed based on distances measured between the point clouds in step 820, as shown in FIG. 23 and discussed below. Finally, step 822 provides for generating cloud-based or local alarms to prevent the collisions from occurring, and/or to notify the caregiver that a collision is likely or has occurred.

Figure 18:
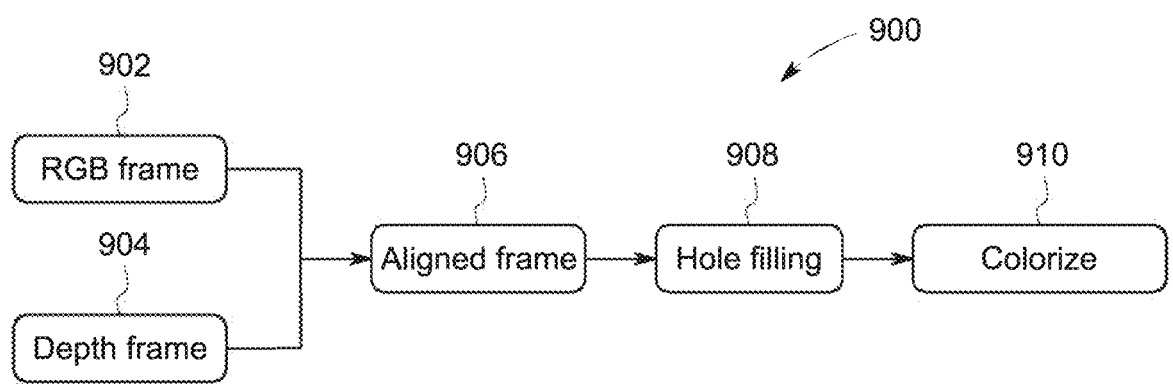
FIG. 18 is an exemplary subprocess for the process of FIG. 17.
Figure 19:
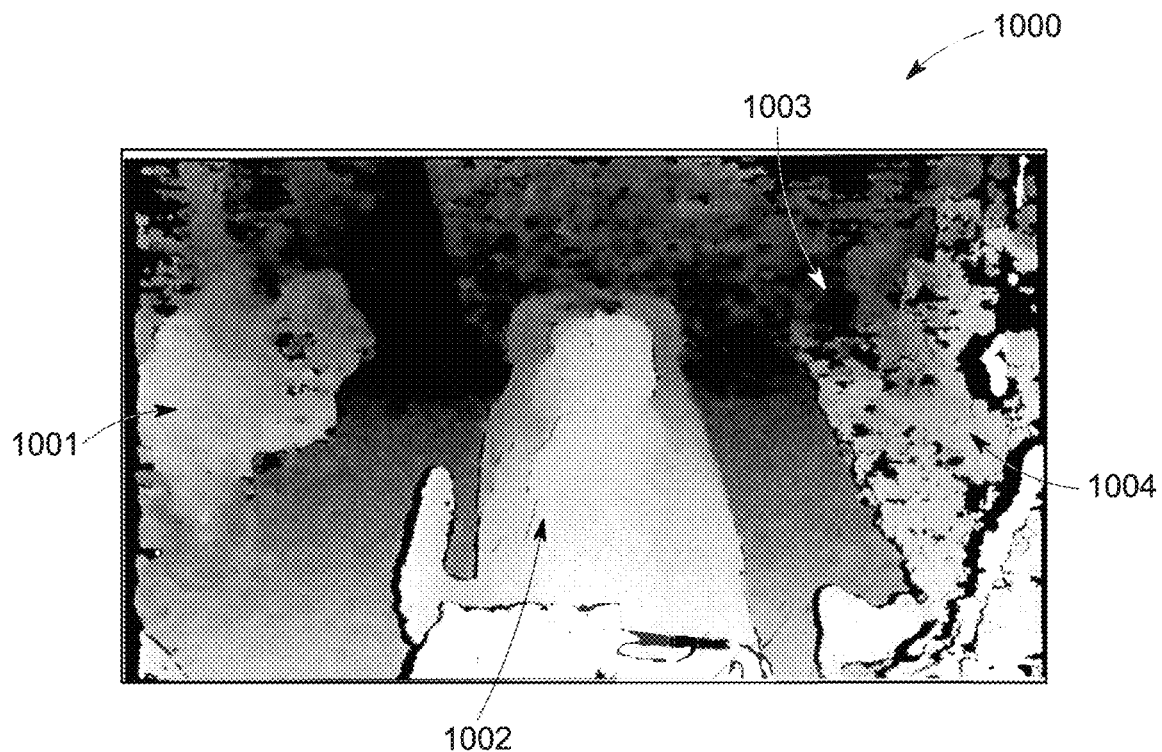
FIG. 19 shows an exemplary output from the subprocess of FIG. 18.

Additional information is now provided in respect to step 804 in conjunction with FIGS. 18 and 19. FIG. 18 shows an exemplary subprocess 900 for pre-processing and resizing the depth in RGB frames. In particular, the RGB frame 902 and depth ring 904 are combined into an align frame 906. In particular, because the RGB and depth sensors of the camera may have different fields of view, the stream does not necessarily align by default and must be therefore intentionally corrected and aligned. The present inventors have identified that combining the RGB frame 902 and depth ring 904 is particularly advantageous and that the pixels from reflective areas in the camera frame or across edges of an object do not always have a valid depth value, and thus require this pre-processing to proceed. Additionally, it can be advantageous to reprocess and resize the frames as shown in FIG. 18 as it is often easier or more accurate to convert the depth information to a visual format before proceeding with processing to be discussed below.

Step 908 of the process 900 in FIG. 18 provides for hole filing of the aligned frame from step 906, whereby invalid or missing depth values or holes within the combined image of filled based on valid pixel data surrounding the hole in a manner known in the art. The result of step 908 is the colorized in step 910, which converts the depth information into a visual representation such as that shown in FIG. 19. In particular, the image 1000 of FIG. 19 as colorized shows a first object 1001, second object 1002, third object 1003, and forth object 10004 after following the process 900 of FIG. 18.

This colorized image from FIG. 19 is then processed via the MaskRCNN pipeline as discussed in step 806 of FIG. 17. The MaskRCNN architecture is used to classify different objects in the room and to obtain and accurate mask for each object found therein. It should be recognized that MaskRCNN is a well-known algorithm to achieve a state-of-the-art semantic segmentation system. In general, MaskRCNN is a supervised learning algorithm that requires properly labeled data in most cases. The core of the MaskRCNN is a CNN (convolution neural network) that functions like a feature extractor. Another sub module referred to as the RPN (region proposal network), along with the feature map, identifies an ROI (region of interest) in the image. These regions of interest may then be input into the classification and mask branches of the MaskRCNN, whereby the classification and mask glares learn to identify objects in those regions of interest with the help of example training data in a manner known in the art. This MaskRCNN typically expects the images and annotation data in COCO format, which is a specific JSON structure dictating how labels and metadata are saved for an image dataset in a manner known in the art, and expects the image data in a square shape (as shown in FIG. 20A).

The input into the MaskRCNN pipeline is an image matrix resized in a square shape (e.g., resizing the image from rectangular shape to square shape, for example 100× 100 pixels). Likewise, the output of the MaskRCNN pipeline is that each object identified within the image is provided with a bounding box, mask of the image, class, and/or predication probability. Poses (e.g., those shown in FIGS. 32-39) are pre-annotated via an annotation tool as known in the art, which are then fed into the neural network as inputs.

Figure 20A:
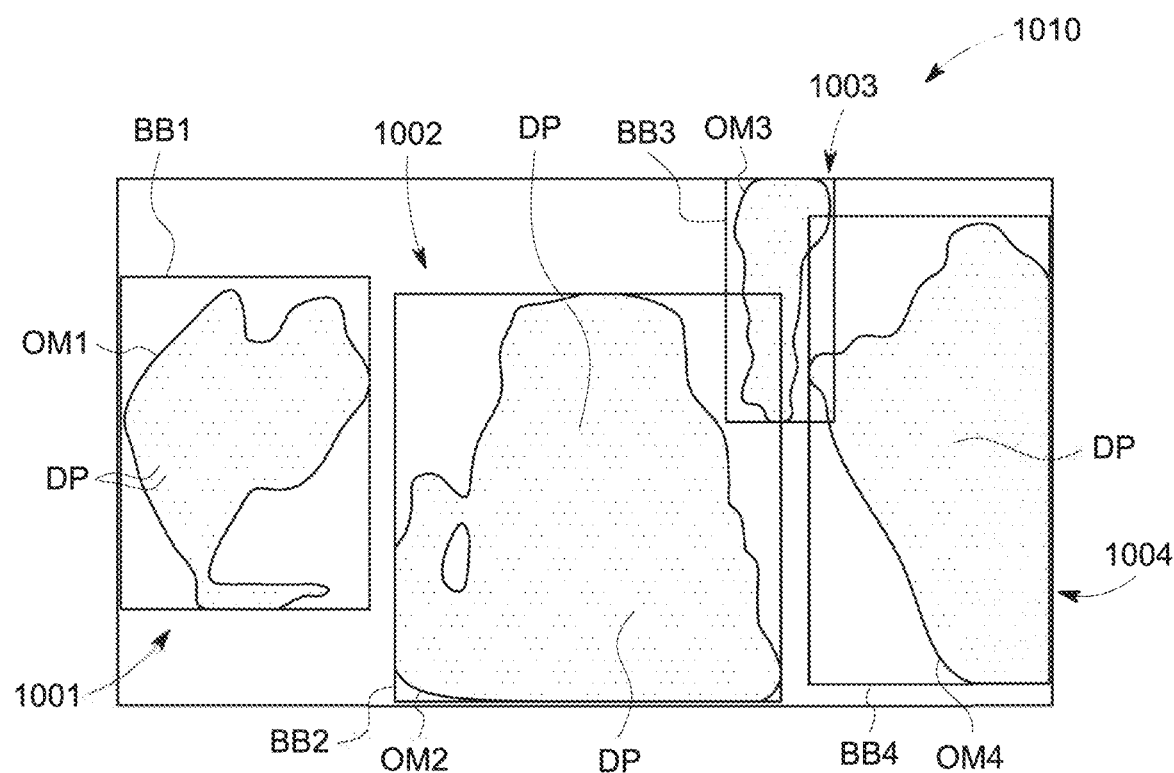
FIGS. 20A-20B show boundary boxes and object masks, and 3D object boxes, for four objects within the output of FIG. 19.

As shown in FIG. 20A, the four objects 1001-1004 from FIG. 19 are shown as data points DP, and provided with a corresponding object mask OM1-OM4 and bounder box BB1-BB4. These four objects 1001-1004 are provided as outputs of the MaskRCNN.

Figure 20B:
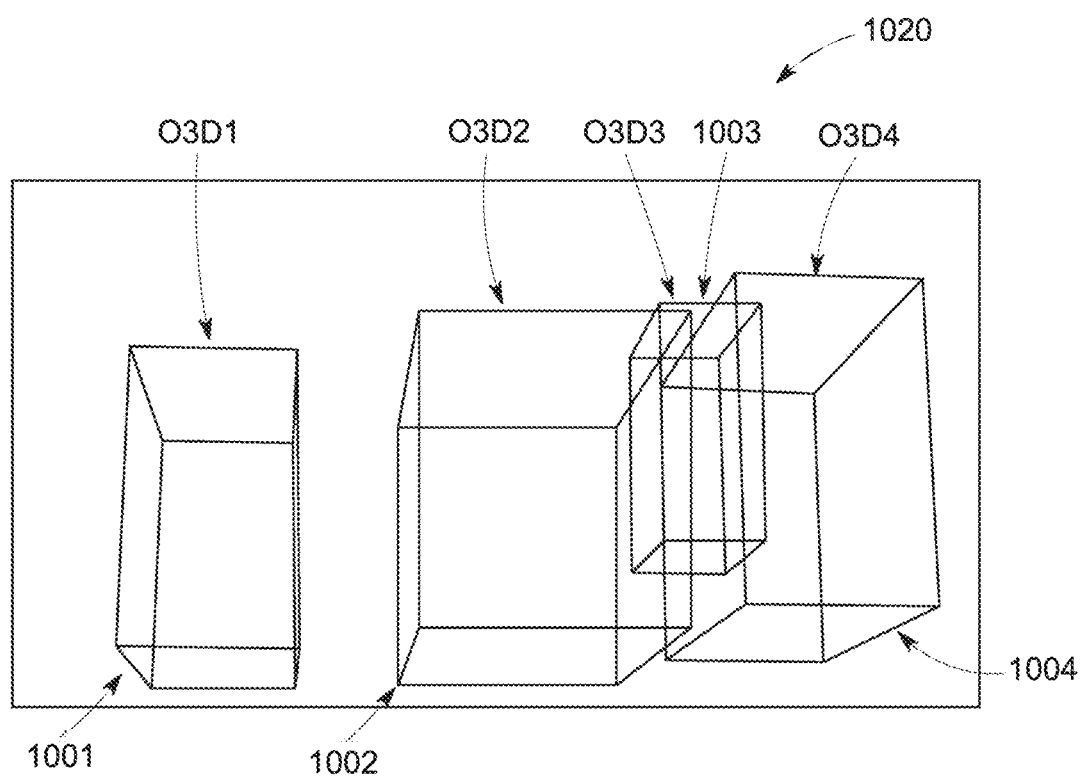

FIG. 20B depicts the boundary boxes BB1-BB4 and object masks OM1-OM4 of objects 1001-1004 in 3D as 3D object boxes O3D1-O3D4. In particular, the 2D bounding boxes are converted to 3D object boxes O3D1-O3D4 by the addition of the depth values.

Figure 21A:
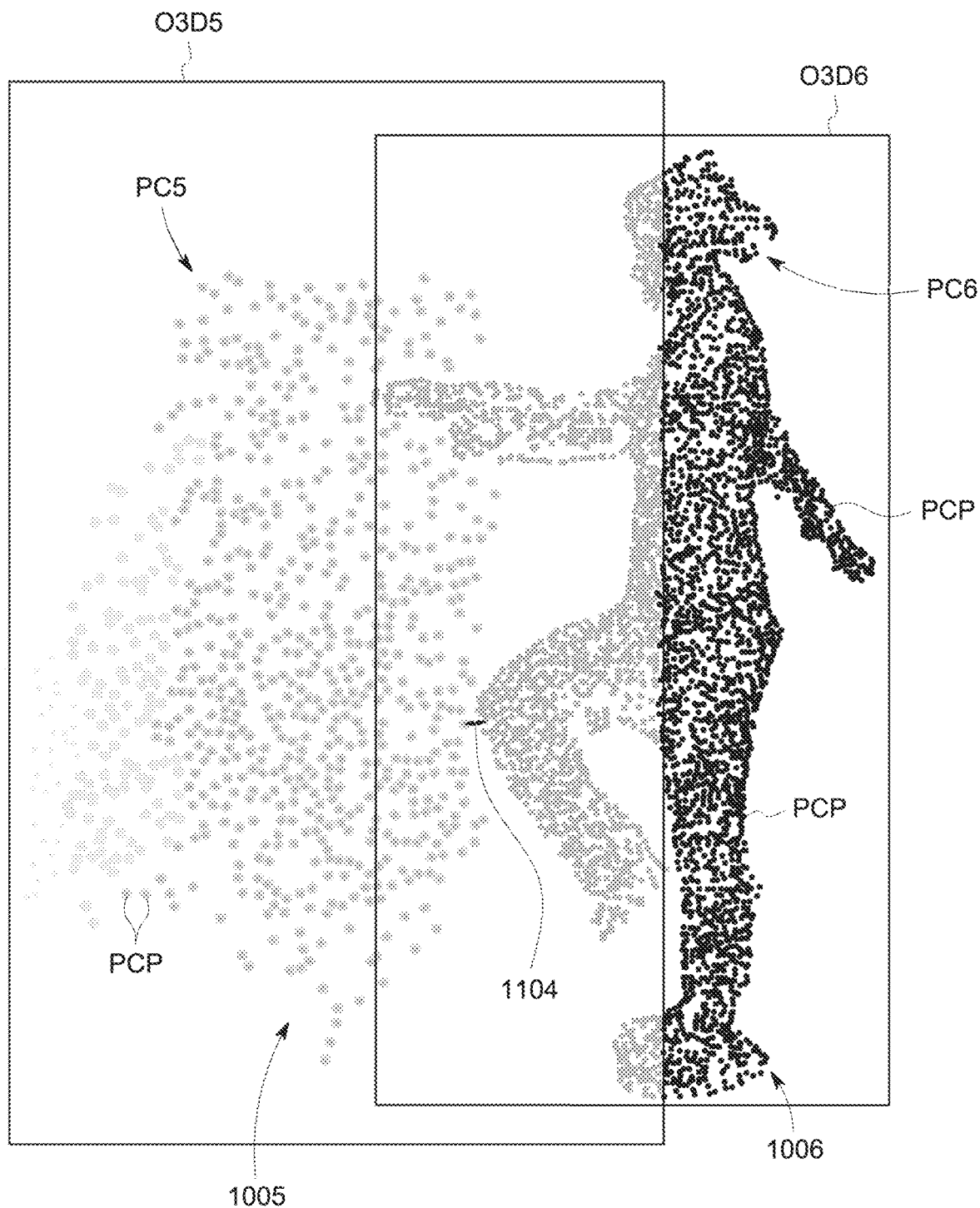
FIGS. 21A-21C show exemplary point clouds generated according to the present disclosure.

The outputs of these 3D objects are then used to generate point clouds for each of the objects 1001-1003 in a manner known in the art. This may include known processing techniques, for example filtering techniques such as thresholding based thickness, back ground subtraction, voxelization, dense to spare filtering, and spurious points removal. FIG. 21A depicts exemplary point clouds for two objects, here objects 1001 and 1006. The point clouds PC5 and PC6 corresponding to objects 1005 and 1006 are each shown comprised of point cloud points PCP, which are also shown bounded by their 3D object boxes (shown as O3D5 and O3D6, respectively). In the example shown, the 3D object boxes O3D5 and O3D6 are overlapping, indicating that a collision is, has, or is likely to be occurring. As is discussed further below, distances (such as distance 1104) can also be measured or calculated between the point cloud points PCP to assess whether the collision has occurred and/or its likelihood of occurring.

Figure 21B:
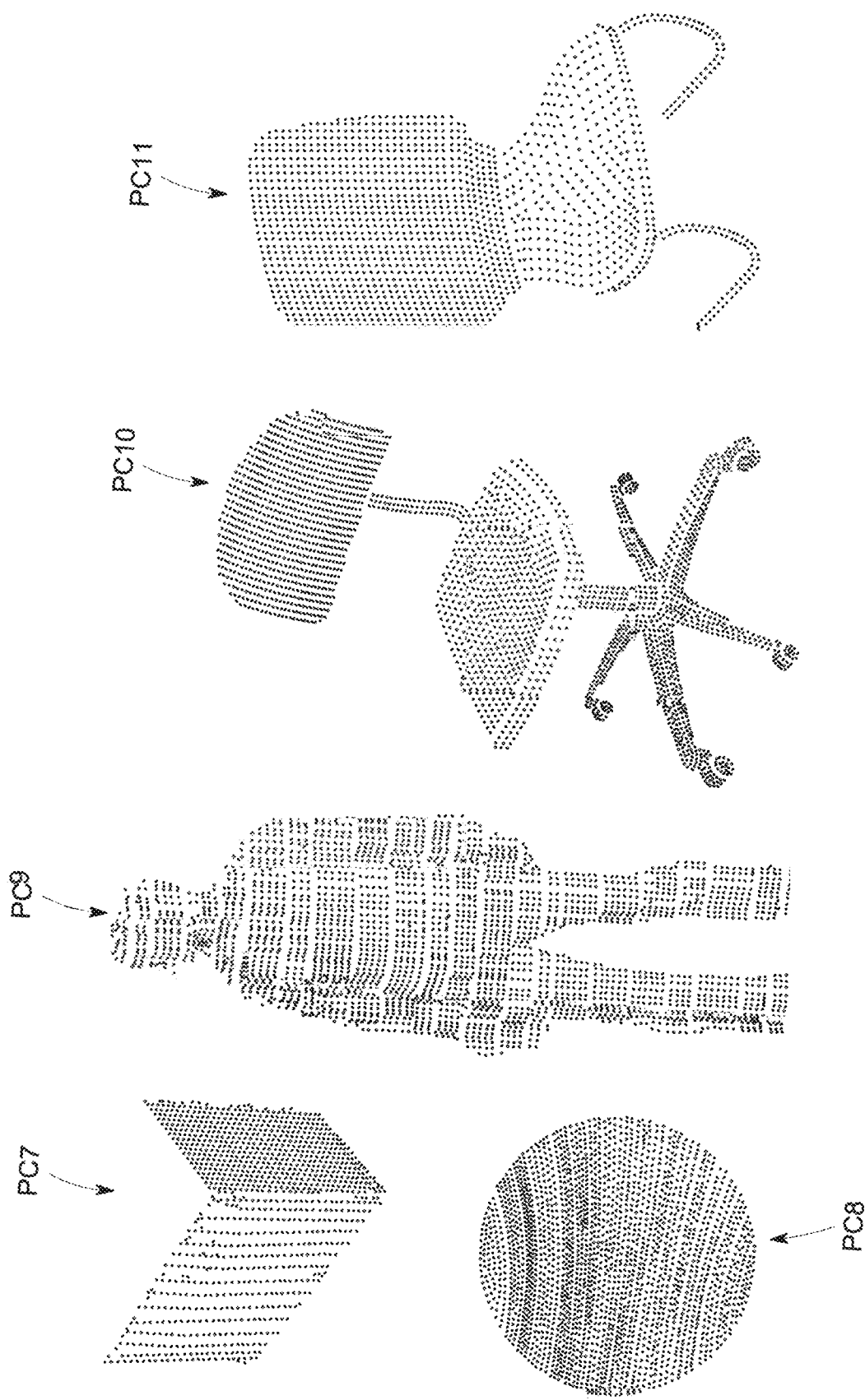

FIG. 21B depicts additional exemplary point clouds PC7-PC11 for different objects identified using the methods described herein. For example, PC7 corresponds to a cabinet or medical equipment, PC9 to a person (whether the patient or another person) and PC10 and PC11 corresponds to different types of chairs. These objects would be recognized based on training provided for the MaskRCNN as discussed above.

Figure 21C:
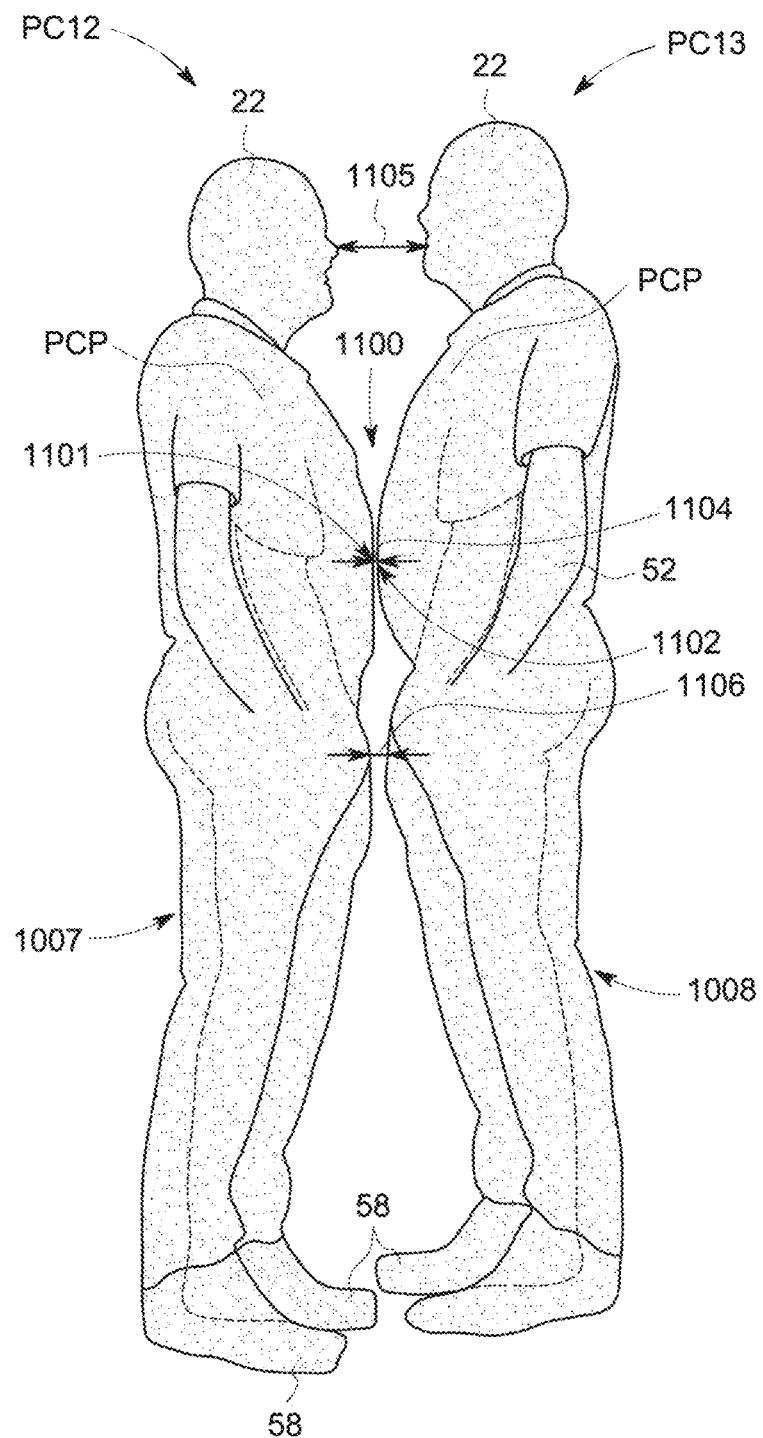

FIG. 21C further depicts a collision between two objects, here objects 1007 and 1008, each being a person. The point clouds PC12 and PC13 corresponding to the objects 1007 and 1008 are shown, respectively, as well as the collision intersection 1100 identified and various distances 1004, 1005, and 1006 between different point cloud points PCP of the objects 1007 and 1008. The points of the objects 1007 and 1008 having the smallest distance therebetween are shown as pints 1101 and 1102, respectively. In certain examples, different distances such as distances 1104-1106 are determine between the nearest point cloud points PCP of the objects 1007 and 1008 should not only determine how close the two objects are, but how close particular body parts or other points of the objects are. For example, a collision score may vary if the distance 1105 between the heads 22 of the people are close relative to simply the hands, as a more substantial injury may occur from collisions of heads then hands. Additional exemplary uses include preventing collisions during radiological scanning or ICU based patient monitoring events (including surrounding lifesaving apparatus). Likewise, the collision detection systems and methods described herein can be used to prevent collisions between two objects, for example when wheeling medical equipment through a crowded hospital.

Beyond identifying the distances between objects and people within an image, it is advantageous to particularly identify or classify the operator (or caregiver) versus the patient as the operator is not the subject of concern in avoiding collision with other objects in the room. This classification may be inferred based of the orientations and positions of the various people relative to other objects in the room. For example, as shown in FIG. 22, a first person 1201 is seen standing next to the boundary B of the bed 70, with a second person 1202 within the boundary B of the bed 70. Likewise, as discussed further below it can be determined that the first person 1201 is sitting or standing, whereas the second person 1202 appears to be lying flat (prone or supine) within the bed. Based on this information, it can be inferred that the first person 1201 is the operator, and the second person 1202 is the patient. Using this information, the system 10 can then follow each person 1201, 1202 as they move about, in other words once the person 1202 is identified as lying in the bed 70, they continue to be recognized as the patient as they move about out of the bed (including when the operator leaves the room, for example).

As previously discussed, certain examples of systems 10 according to the present disclosure provide for measuring the distance 1104 between point cloud points PCP of different objects, for example as Hausdorff and/or Euclidian distances, which may be compare to a threshold value to determine the probability of a collision occurring. FIG. 23 provides an exemplary process 1200 for calculating the probability of a collision occurring according to the present disclosure. Step 1202 provides for accessing a database (DB) of object masks for analysis of the images received from the camera. Step 1204 then provides for identifying a first object from the object masks accessed in step 1202 being present within the images, for example identifying an object corresponding to a chair, a person, or a hospital bed.

If a first object is identified, and this object is determined to be a person, the process continues at step 1206, converting the person mask from the object mask of the database to a point cloud 1206, such as that shown in FIG. 21A. The process continues with then identifying in step 1208 whether a second object from the database can also be identified within the images. If not, the process return to step 1204. If instead a second object is identified within the images in step 1208, the process continues to step 1210, whereby the second object mass is also converted to a point cloud in the manner previously discussed.

A distance is then calculated in step 1212 between the first and second objects, in certain examples as the Hausdorff and/or Euclidian distances between the closest points of the two point clouds. In particular, the Hausdorff and/or Euclidian distances may be computed between a snap radius of the patient's point cloud (as Set A), and the snap radius of another object's point could (as Set B), for example. The snap radius will be recognized as being the circumference of the point cloud's boundary contour, which may be determined using methods presently known in the art. Step 1214 then provides for comparing these calculated distances to a predetermined threshold (e.g., an empirically determined value). If the calculated distance of step 1212 does exceed the threshold as determined in step 1214, the process returns to step 1208. If instead the calculated distance is below the threshold that is determined in step 1214, the process continues to step 1216, whereby a probability of collision is determined (e.g., predicted by feeding the Hausdorff and/or Euclidian distances to a neural network).

Figure 24A:
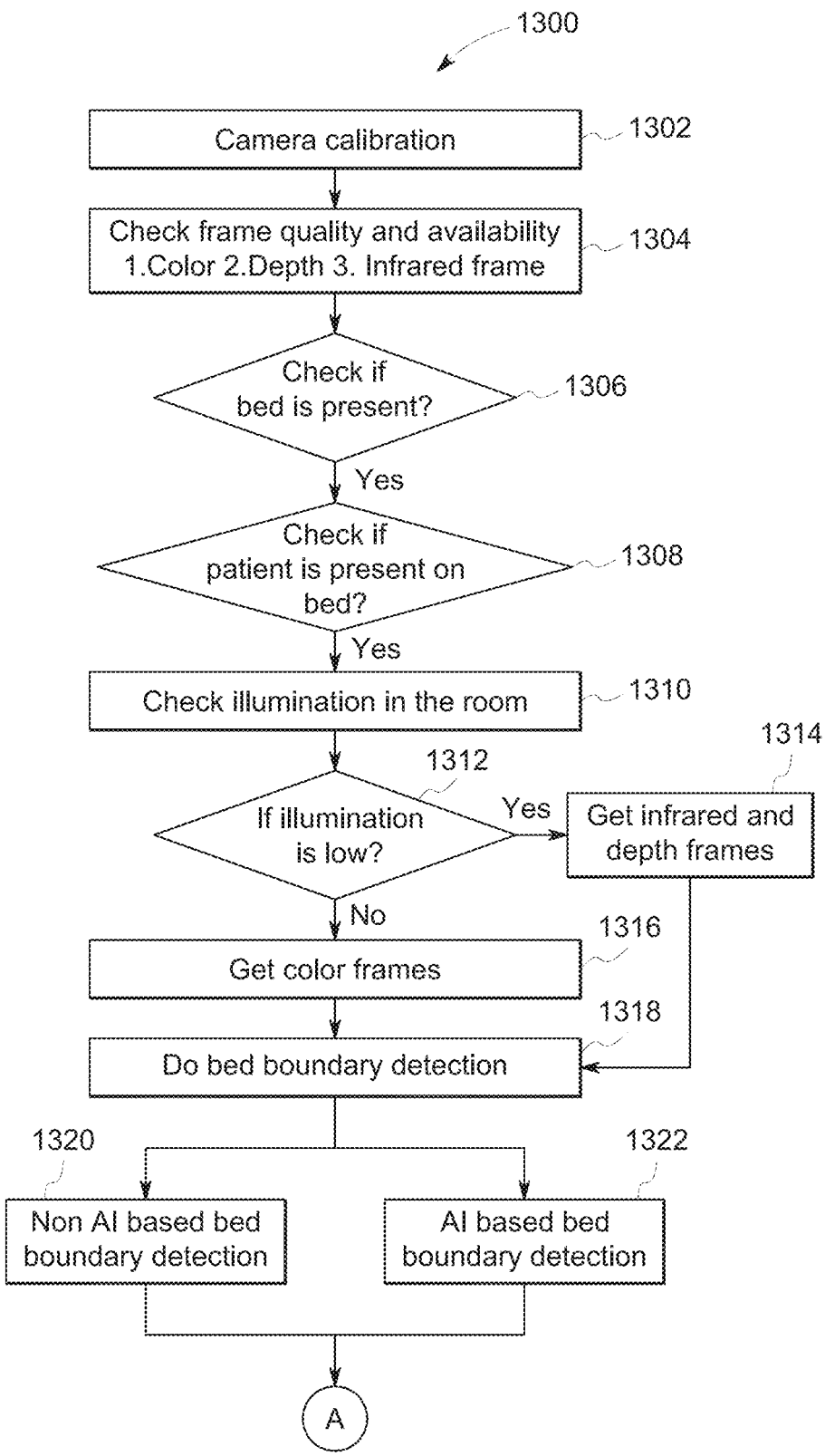
FIGS. 24A-24B show another exemplary process for determining a collision score according to the present disclosure.
Figure 24B:
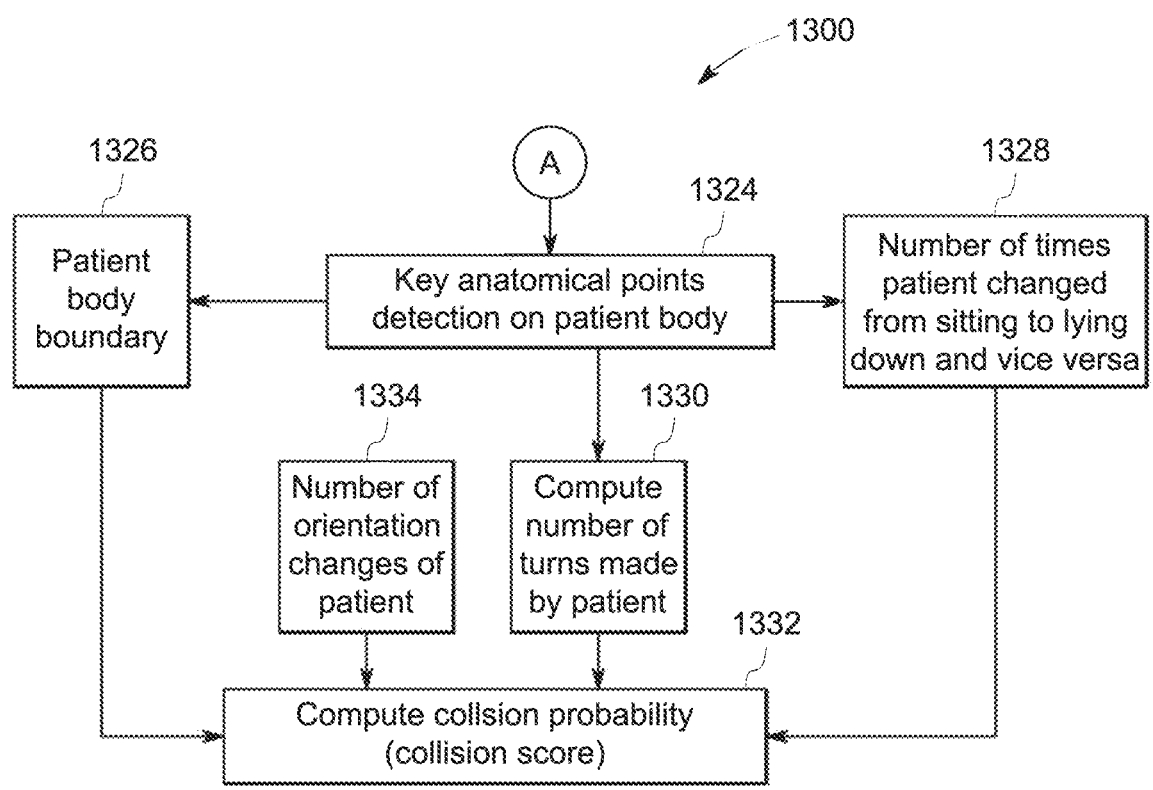

FIGS. 24A-24B depict an exemplary process 1300 for computing a collision probability or collision score according to the present disclosure. Steps 1302-1308 may be accomplished using techniques discussed above, which include calibration of the camera, checking the frame quality and availability of images in terms of the color frame, depth frame, and infrared frame, determining whether the bed is present, and determining whether the patient is present in the bed. For example, depth and the number of holes may be used as a quality check scheme. If each of these steps is concluded in the affirmative, the process continues to step 1310 whereby the illumination in the room is compared against a threshold.

If it is determined in step 1312 that the illumination is low, the process continues at step 1314, whereby the infrared and depth frames from the camera are used to do the bed detection in step 1318. If instead the illumination is not determined to be low in step 1312, the color frames from the camera are used in step 1316 to determine the bed boundary detection of step 1318. Specific details for the identification of the bed boundary are discussed above with respect to the departure score determination.

In general, the bed boundary of FIGS. 24A-24B may be determined using an AI based detection method in step 1322, for example using the process 200 of FIG. 5 discussed above. Alternatively, the bed boundary may be determine through non AI based detection methods in step 1320. For example, "X2" may refer to previously described non-AI based methods such as edge detection of the bed, non-maxima suppression of edges, finding local, maxima and minima of bed curvatures, and/or gradient geodesic contour of bed area.

With continued reference to FIGS. 24A-24B, after the bed boundary is detected in one of the manners previously described, the process continues to step A as shown beginning the process in FIG. 24B. In particular, the process continues with step 1324, identifying key anatomical hotspots P on the patients body. As discussed above, these hotspots can be used to determine the number of changes the patient changes from sitting to laying down and vice versa in step 1328, for example, using one of the methods previously discussed and shown in FIGS. 5, 11, and/or 12. This number is then fed into the algorithm for computing the collision probability score in step 1332.

Likewise, the hotspots identified in step 1324 for the patient may be used to compute a number of turns made by the patient in step 1330, as previously discussed and shown in FIG. 5. This number of turns is also an input to computing the collision probability in step 1332.

The number of orientation changes in the patient can also be determined in step 1334, which was also previously discussed and can be performed using the process 400 of FIG. 10, also serving as an input to computing the collision probability in step 1332. Additionally, the key anatomical hotspots detected on the patient in step 1324 may be further used to determine a patient body boundary in step 1326, for example as previously described and shown in FIGS. 8 and 9A-9C, which also serves as an input to computing the collision probability score in step 1332.

The present disclosure also relates to detecting and preventing an exit from the bed (e.g., in a non-falling context), which is described in relation to FIGS. 25-40. The present inventors have identified that it is beneficial to know when a patient is likely to exit the bed, even intentionally, as this may be ill-advised or hazardous based on the patient's current condition. An exit score, determined according to the present disclosure, can also alert the caregiver to pay closer attention to a given patient having a higher score. The caregiver can also anticipatorily go to the patient to see what they need, remind the patient to remain in bed, and/or modified various tubes or electrical connections to the patient in preparation for an exit.

Figure 25:
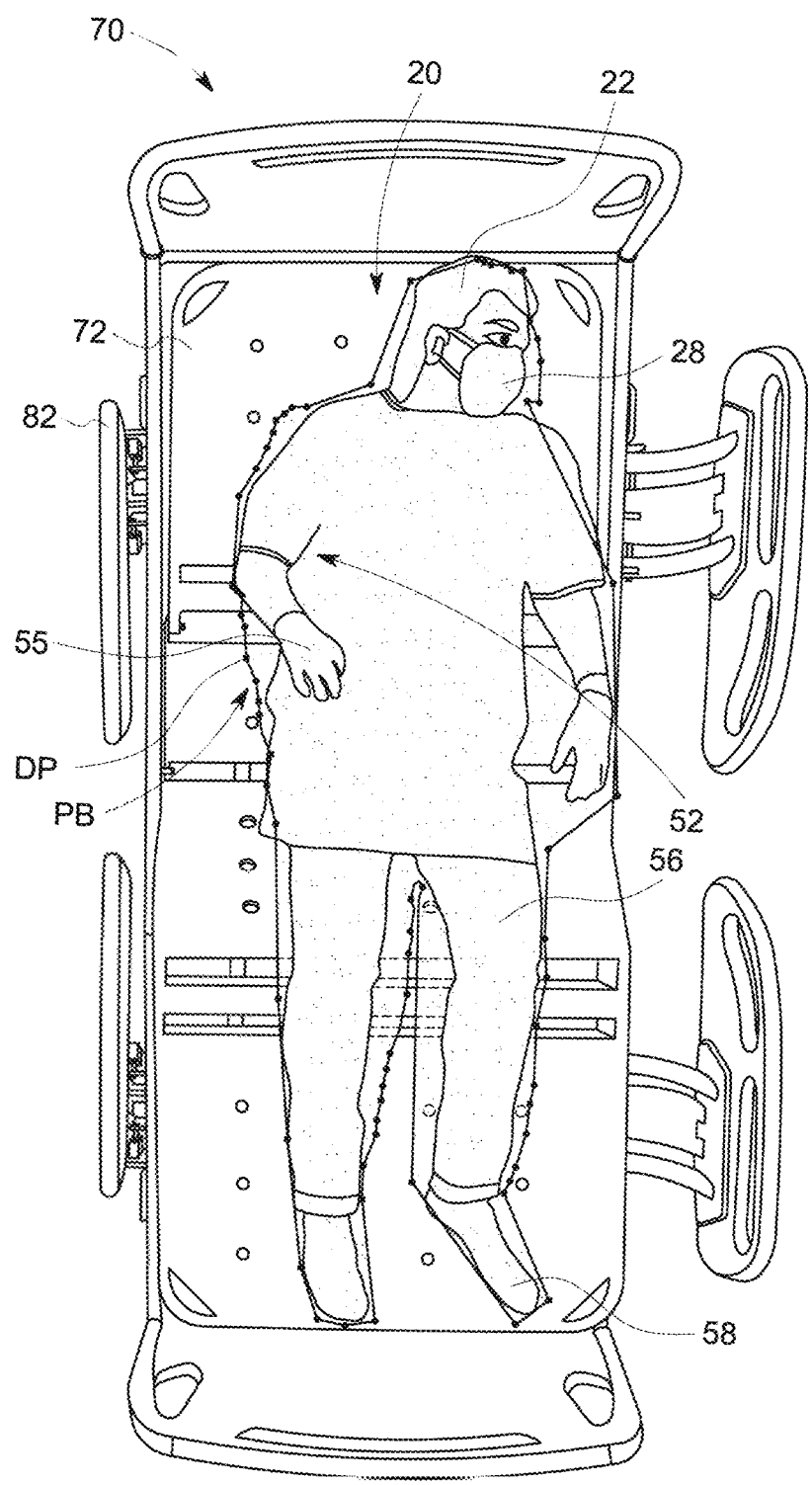
FIGS. 25-26 show patient boundaries around the patient using artificial intelligence and non-artificial intelligence techniques according to the present disclosure.
Figure 26:
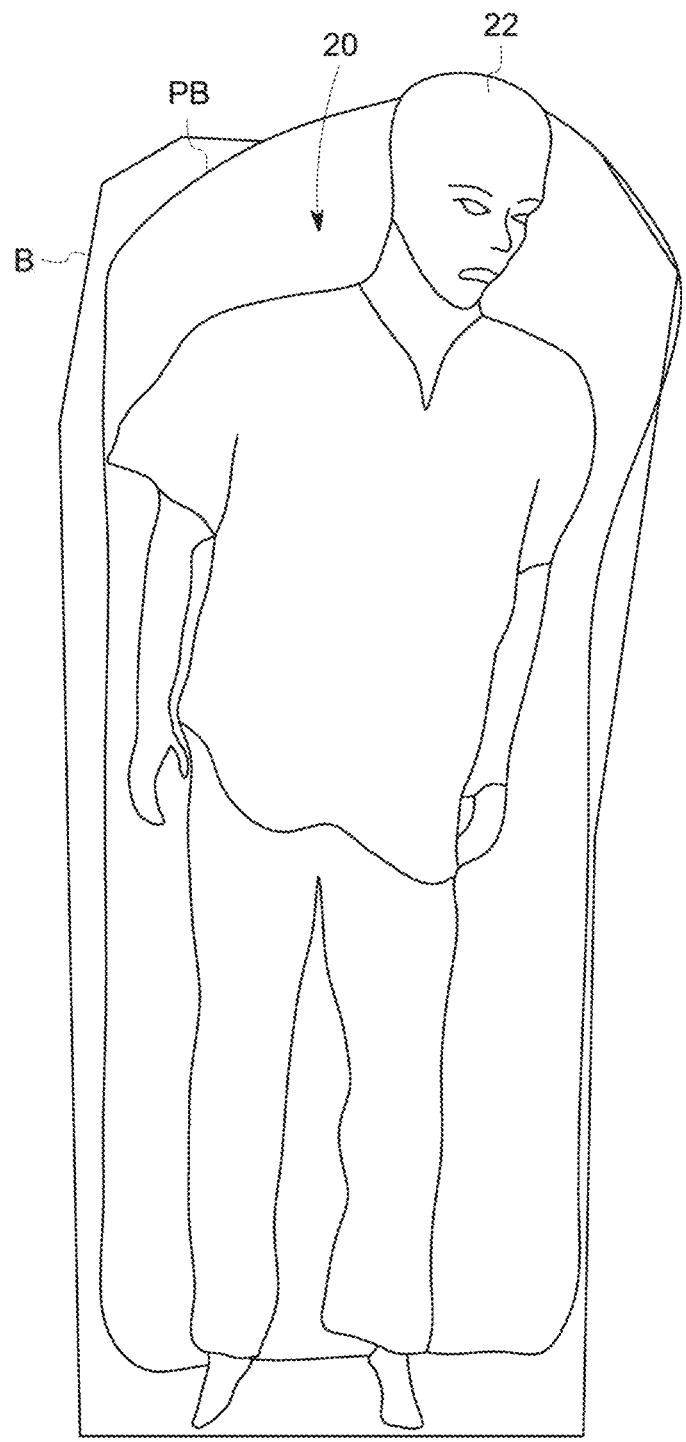
Figure 27:
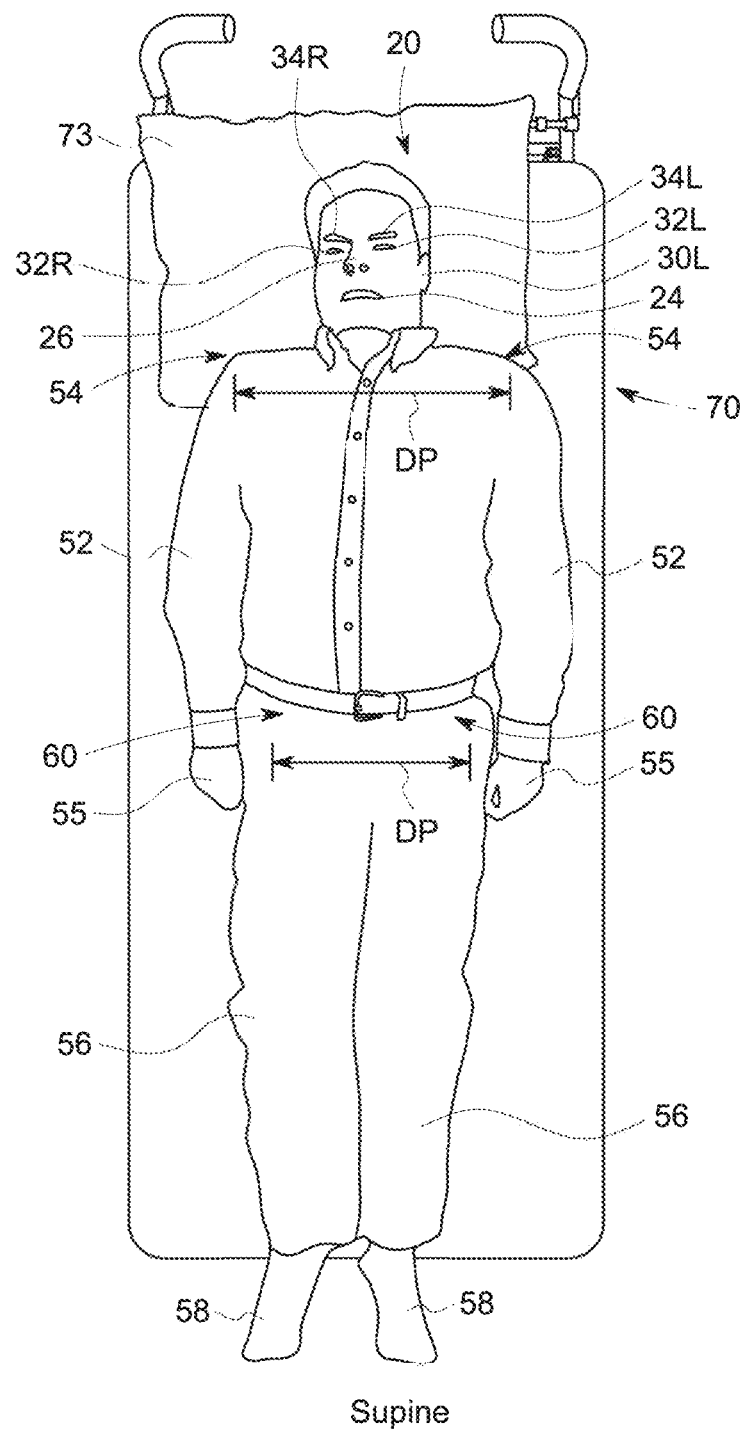
FIGS. 27-30 depict exemplary classes of patient orientation for classification by a system according to the present disclosure.
Figure 28:
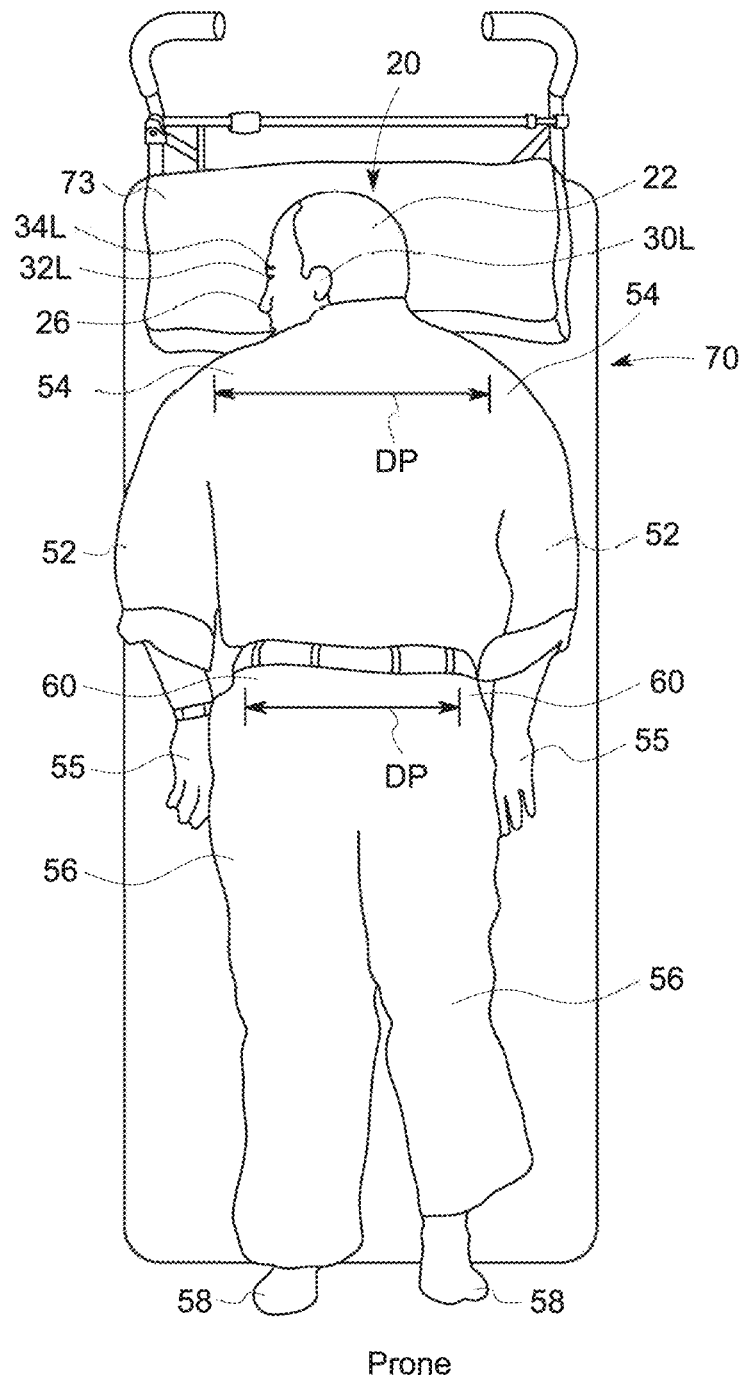
Figure 29:
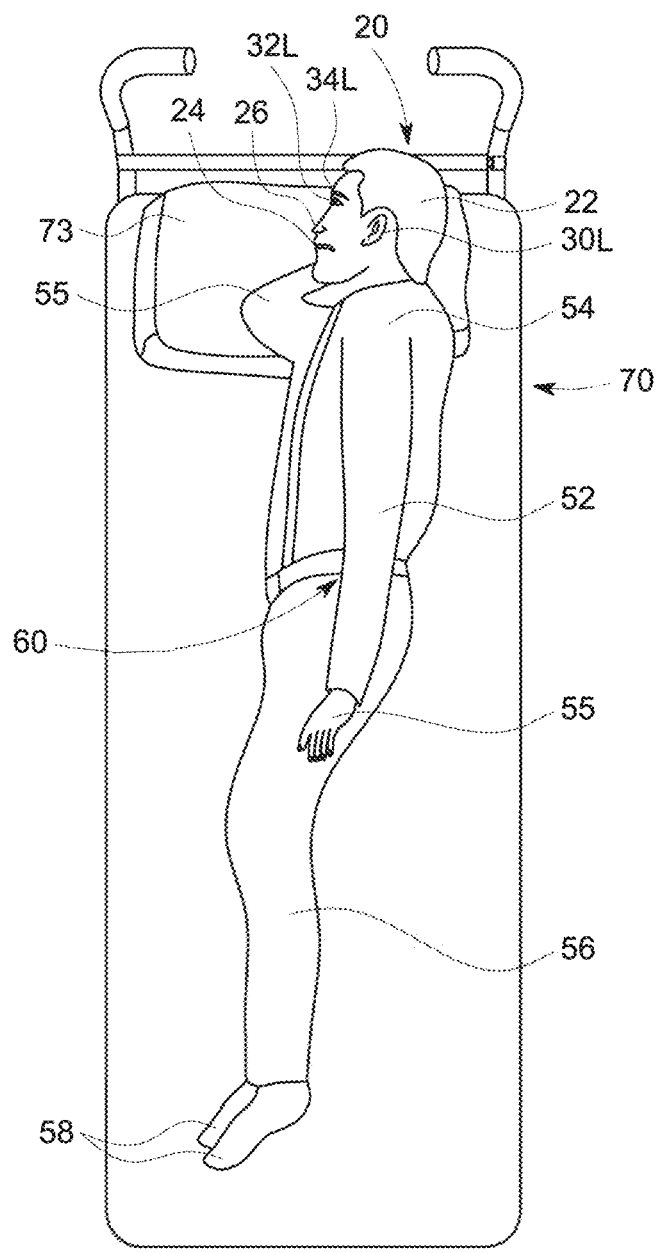
Figure 30:
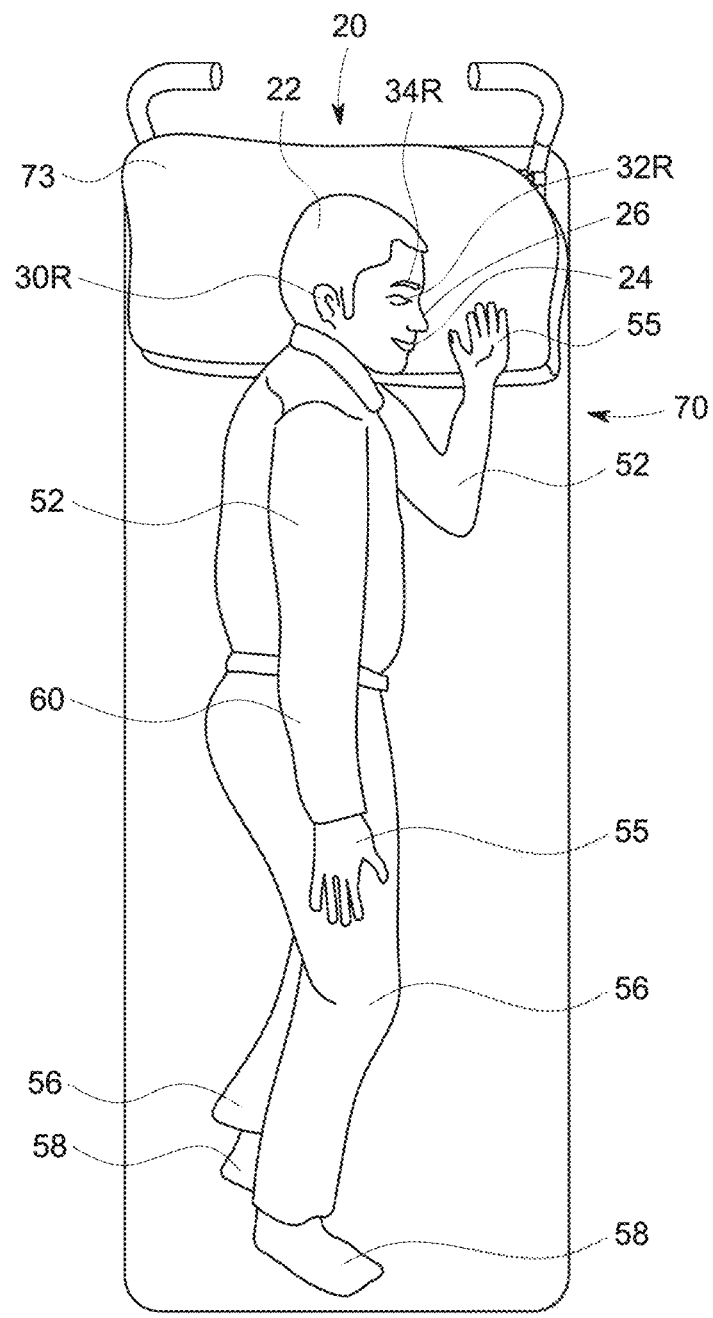

FIG. 25 depicts a patient boundary PB formed by data points BP surrounding the patient 20 lying in bed 70 using artificial intelligence, for example. The patient boundary PB may be used for determining a fall score or a collision score (i.e., collisions while the patient remains in bed), but is discussed here in the context of an exit score. In certain examples, the collision score is not a literal score, but a radius from an object in which to trigger alarm if a patient or another object is within that radius. In further examples thereof, the collision radius is based on an empirical value being greater than certain threshold (thickness obtained from depth frames), again determined empirically, whereby collision alert is then flagged. The threshold is determined according to size, whereby the larger the object, the larger the threshold. In the case of a patient collision with another patient or an object, this collision alert is generated based on the snap radius of the patient boundary, determined as described above and further using methods presently known in the art. Alternatively, FIG. 26 depicts a patient boundary PB determined for the patient 20 using non AI techniques.

FIGS. 27-30 depict 4 different classes of patient orientation as determined by artificial intelligence algorithms and/or other methods according to the present disclosure. In certain examples, the AI algorithms use the position and presence of body parts within the image to assign one of the classes to the patient 20. For example, the AI algorithm may use information relating to the mouth 24, nose 26, left/or right cars 30L, 30R, left/or right eyes 30L, 32R, left/or right eyebrows 34L, 34R, arms 52, shoulders 54, legs 56, and feet 58, for example. For instance, if both the left eye 32L and right eye 32R are visible within the image, the AI algorithm will most likely assign the patient 20 as being supine. Likewise, distances between hotspots DP, for example between the hips 60, may be used to determine the class of the patient, whereby laying in the supine or prone position would have a greater distance between hotspots DP for the hips 60 than being in a left-lateral or right-lateral positions, respectively.

Figure 39:
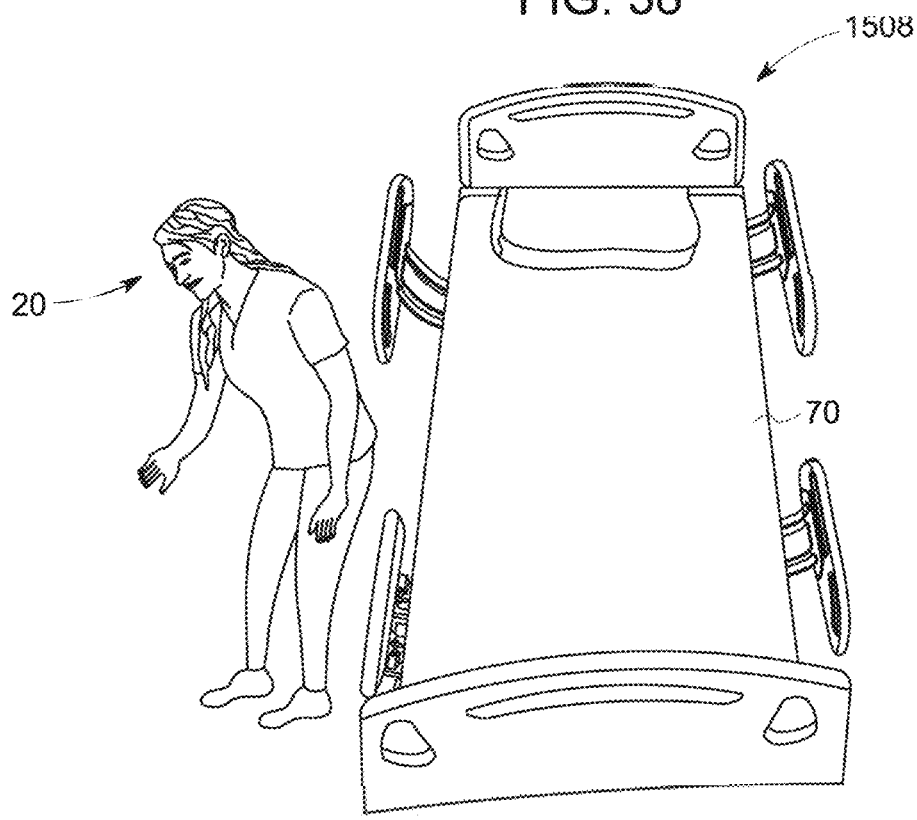

In certain examples, the AI or other algorithm particularly compares the image of the patient 20 against learned or pre-established classes, such as classes 1500-1508 shown in FIGS. 32-39. These classes may not only relate to the orientation of the patient 20 within the bed 70, but also their wakefulness state (awake versus asleep or resting, such as determined at least in part by whether the eyes are opened), whether the patient is sitting or lying down, whether the patient is beginning to exit (FIGS. 36 and 37) or have already exited (FIG. 39).

Figure 31:
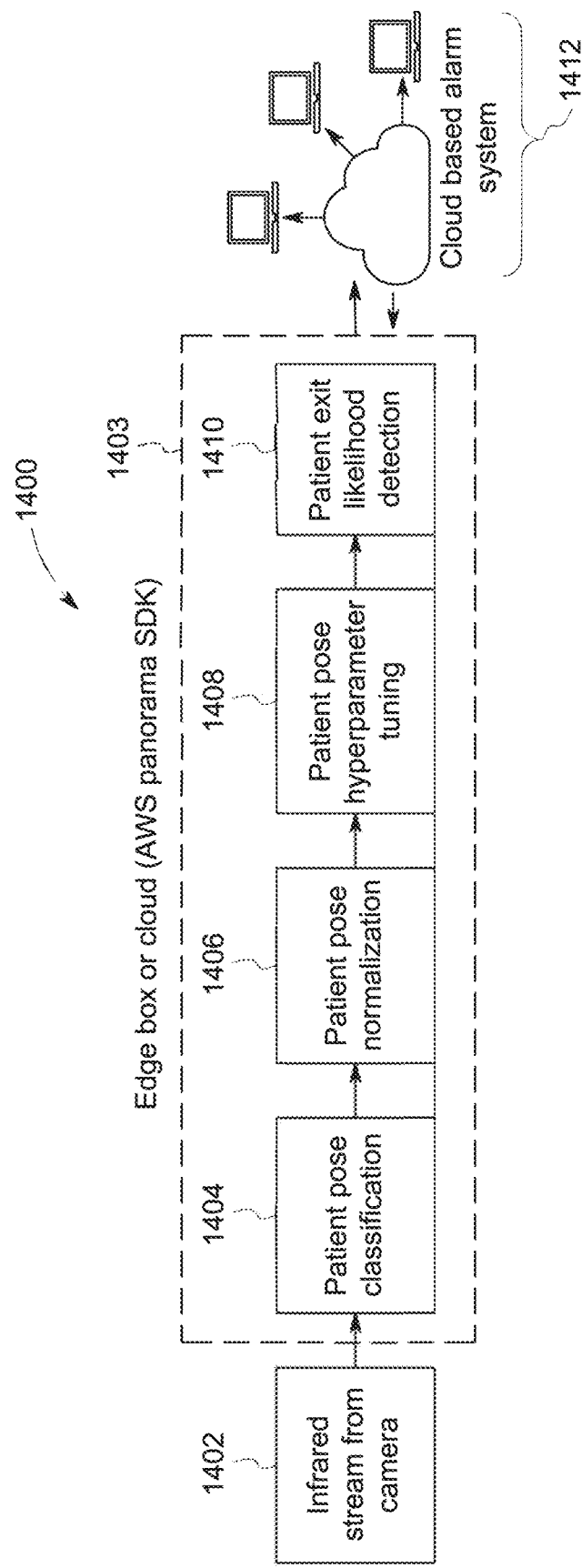
FIG. 31 is an exemplary process for determining a departure score according to the present disclosure.
Figure 32:
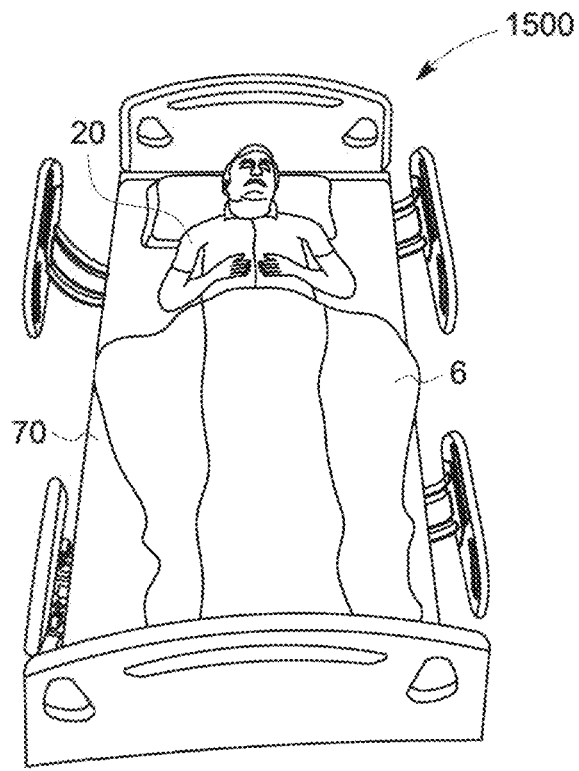
FIGS. 32-39 depict additional exemplary classes of patient orientation for classification by a system according to the present disclosure.
Figure 33:
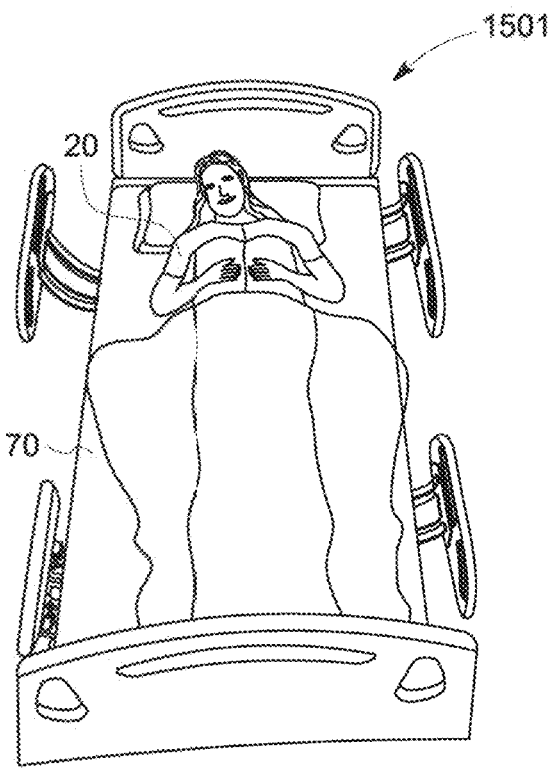
Figure 34:
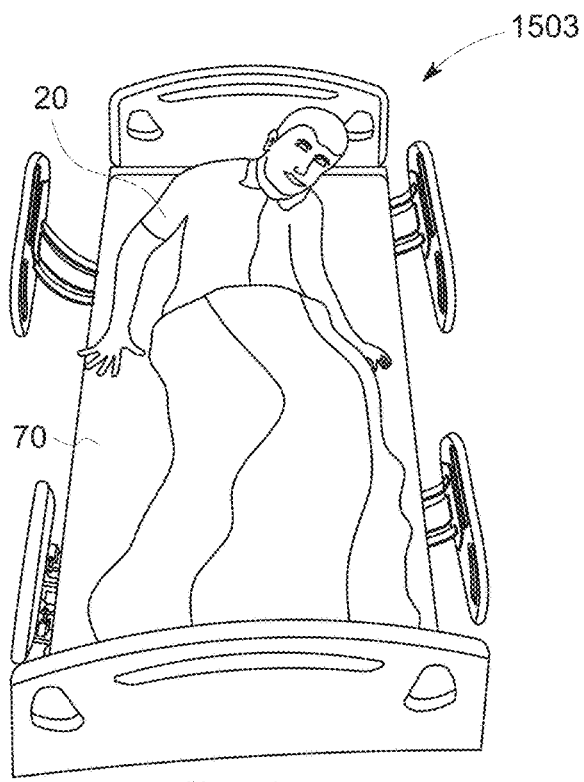
Figure 35:
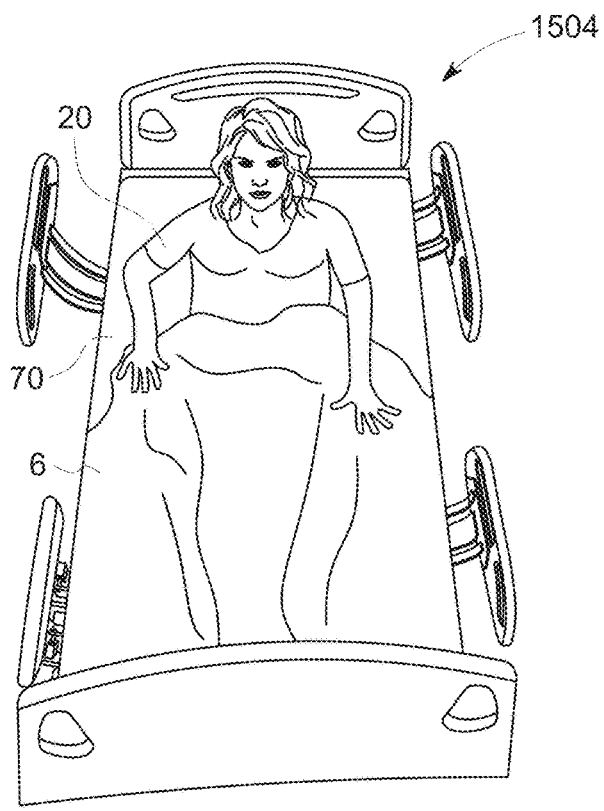
Figure 36:
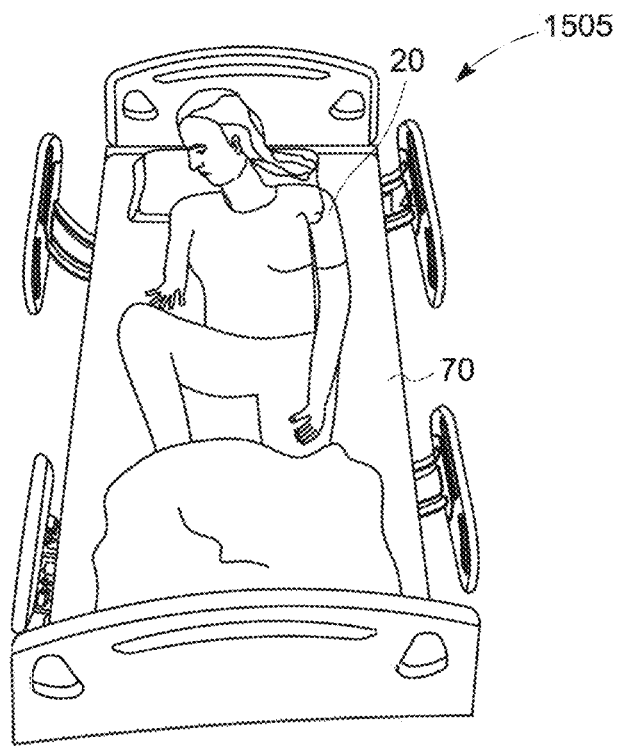
Figure 37:
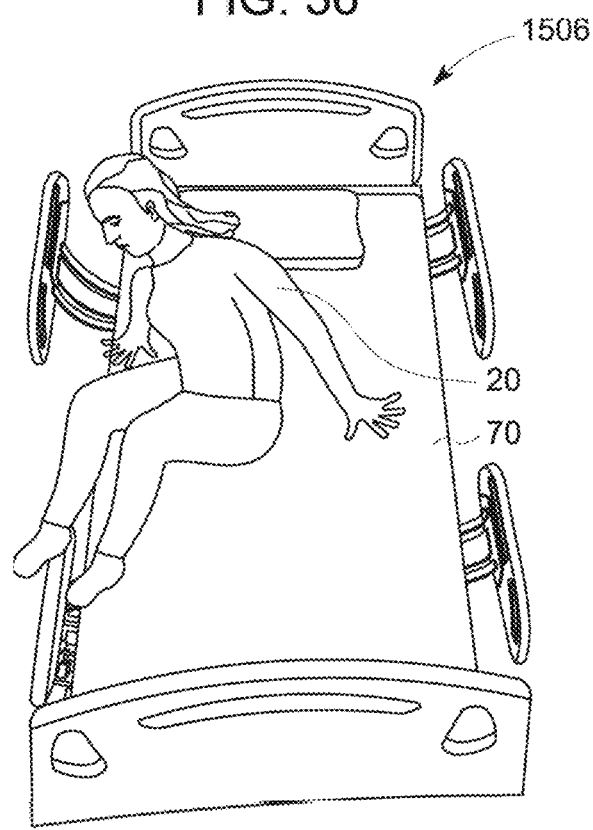
Figure 38:
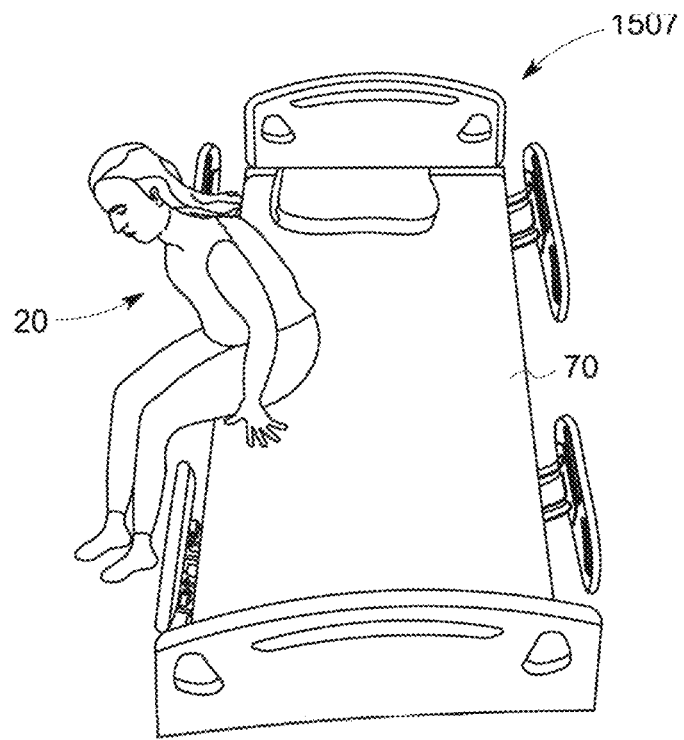

FIG. 31 depicts and exemplary process 1400 (and devices used to perform the process) to identify a departure score for the patient's likelihood for exiting the bed, for example intentionally. Step 1402 begins with receiving the infrared stream from the camera 12 as previously described, which may be fed into an edge box or cloud system 1403, such as the amazon web solutions (ADS) panorama SDK. In the configuration shown, the edge box or cloud system 1403 may perform steps 1404-1410, which include determining the patient posed classification as previously discussed, normalizing the patient's pose in step 1404, performing patient-hyper parameter tuning in step 1408 (which is part of the training process and not included as final output of the algorithm), and finally determining a patient exit likelihood or a departure score in step 1410.

Step 1410 may include one or more of the inputs to the departure score assessment module 95 of FIG. 2. Finally, the departure score generated in step 1410 is embedded into a cloud based alarm system 1412 to prevent the patient from exiting and/or notify a caregiver, for example in a manner previously discussed with respect to departure scores in the context of fall scores.

In certain examples, the AI model used to predict the exit score or departure score uses patient pose metrics, without relying on other metrics such as anatomical hotspots P on the patient as previously discussed. In further examples, an AI model is built leveraging the concept of transfer learning. Transfer learning allows the system 10 to use a pre-existing model, trained on a large database, to perform tasks.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A method for preventing an unintended collision between a person and a separate object using a camera, the method comprising:
    capturing images of the person and the separate object using the camera, wherein the separate object and the person are non-coupled to each other;
    accessing a database of point clouds;
    identify a first point cloud corresponding to the person and a second point cloud corresponding to the separate object within the database of point clouds;
    calculating a closest distance between the person and the separate object;
    comparing the closest distance to a threshold; and
    generating a notification when the closest distance is below the threshold to prevent the person and the separate object from unintentionally colliding and thus prevent the separate object from injuring the person.

2. The method according to claim 1, wherein the first point cloud for the person is based on a first mask identified as corresponding to the person and the second point cloud for the separate object is based on a second mask identified as corresponding to the separate object, wherein the closest distance between the person and the separate object is calculated between the first point cloud and the second point cloud.

3. The method according to claim 2, wherein nearest points between the first point cloud and the second point cloud are used to calculate the closest distance between the first point cloud and the second point cloud.

4. The method according to claim 1, wherein the person is a patient, further comprising identifying that the patient is within a bed, wherein the separate object is other than the bed.

5. The method according to claim 4, wherein the person is identified as being the patient based on identifying that the patient was within the bed, further comprising maintaining the identification of the person being the patient after the patient has left the bed.

6. The method according to claim 1, wherein a third object is captured in the images from the camera, further comprising identifying a third point cloud within the database of point clouds that corresponds to the third object and identifying the third object as being a caregiver.

7. The method according to claim 6, wherein the third object is identified as being the caregiver based on the patient being identified as being within a bed.

8. The method according to claim 7, further comprising excluding notifications based on the third object when the third object is identified as being the caregiver.

9. The method according to claim 1, further comprising determining a collision probability based on comparing the closest distance to the threshold.

10. The method according to claim 9, wherein the person is a patient in a bed, further comprising determining an orientation of the patient, and wherein the collision probability varies based on the orientation of the patient.

11. The method according to claim 10, wherein the orientation is classified as being one of supine, prone, and lateral.

12. The method according to claim 10, further comprising counting a number of times the orientation changes for the patient, wherein the collision probability varies based on the number of times the orientation changes for the patient.

13. The method according to claim 1, wherein the person is identified as being a patient, wherein the patient has body parts, and wherein the closest distance between the person and the separate object is calculated each of the body parts, further comprising determining when the closest distance for each of the body parts to the separate object is less than the threshold.

14. The method according to claim 13, wherein the notification includes an image of the patient and the body parts thereof, further comprising displaying a given body part within the body parts differently within the image when the closest distance corresponding thereto is less than the threshold.

15. The method according to claim 14, where the given body part is shown in a given color only when the closest distance corresponding thereto is less than the threshold.

16. The method according to claim 1, wherein the person and the separate object are inside a patient room, wherein the camera is within the patient room, and wherein the notification is an audible alarm within the patient room.

17. The method according to claim 1, wherein calculating the closest distance between the person and the separate object and comparing the closest distance to the threshold are performed in real-time.

18. A non-transitory medium having instructions thereon that, when executed by a processing system, causes a system for preventing unintended collisions between a person and a separate object using a camera to:
    capture images of the person and the separate object using the camera, wherein the separate object is spaced apart from the person;
    access a database of point clouds;

identify a first point cloud corresponding to the person and a second point cloud corresponding to the separate object within the database of point clouds;

calculate a closest distance between the person and the separate object;

compare the closest distance to a threshold; and generate a notification when the closest distance is below the threshold to prevent the person and the separate object from unintentionally colliding and thus prevent the separate object from injuring the person.

19. The non-transitory medium according to claim 18, wherein the person is identified as being a patient, wherein the patient has body parts, and wherein the closest distance between the person and the separate object to prevent the person and the separate object from unintentionally colliding and thus prevent the separate object from injuring the person is calculated for each of the body parts, wherein the system is further caused to determine when the closest distance for each of the body parts to the separate object is less than the threshold, wherein the notification includes an image of the patient and the body parts thereof, wherein the system is further caused to display a given body part within the body parts differently within the image when the closest distance corresponding thereto is less than the threshold.

20. A method for preventing an unintended collision between a patient and a separate object using a 3D camera, the method comprising:

capturing images of the patient and the separate object using the 3D camera, wherein the separate object is spaced apart from the patient;

accessing a database of masks;

identify a first mask corresponding to the patient and a second mask corresponding to the separate object within the database of masks;

generating a first point cloud for the patient based on the first mask and a second point cloud for the separate object based on the second mask;

calculating a closest distance between nearest points within the first point cloud and the second point cloud;

determining an orientation of the patient;

determining a collision probability based on closest distance calculated between the nearest points within the first point cloud and the second point cloud and based on the orientation determined for the patient; and generating a notification when the collision probability exceeds a threshold to prevent the patient and the separate object from unintentionally colliding and thus prevent the separate object from injuring the patient.

* * * * *